United States Patent
Oishi et al.

(10) Patent No.: US 9,568,193 B2
(45) Date of Patent: Feb. 14, 2017

(54) AIR POLLUTION CONTROL SYSTEM AND AIR POLLUTION CONTROL METHOD

(71) Applicant: MITSUBISHI HEAVY INDUSTRIES, LTD., Tokyo (JP)

(72) Inventors: Tsuyoshi Oishi, Tokyo (JP); Hiroshi Tanaka, Tokyo (JP); Hiromitsu Nagayasu, Tokyo (JP); Takuya Hirata, Tokyo (JP); Yoshinori Kajiya, Tokyo (JP); Tomoki Noborisato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/432,449

(22) PCT Filed: Oct. 11, 2012

(86) PCT No.: PCT/JP2012/076368
§ 371 (c)(1),
(2) Date: Mar. 30, 2015

(87) PCT Pub. No.: WO2014/057567
PCT Pub. Date: Apr. 17, 2014

(65) Prior Publication Data
US 2015/0241059 A1    Aug. 27, 2015

(51) Int. Cl.
*B01D 53/50* (2006.01)
*B01D 53/62* (2006.01)
(Continued)

(52) U.S. Cl.
CPC ............ *F23J 15/04* (2013.01); *B01D 53/002* (2013.01); *B01D 53/1425* (2013.01);
(Continued)

(58) Field of Classification Search
CPC ......... B01D 53/50; B01D 53/62; B01D 53/74; B01D 53/75; B01D 53/77; B01D 53/14; B01D 53/1431; B01D 53/1456; B01D 53/1475
See application file for complete search history.

(56) References Cited

U.S. PATENT DOCUMENTS

2010/0294131 A1* 11/2010 Bade .................. B01D 53/50
                                                      95/223
2011/0076216 A1*  3/2011 Orita .................. B01D 53/75
                                                      423/242.1
(Continued)

FOREIGN PATENT DOCUMENTS

CA    2 696 524 A1    2/2009
EP      0671199 A2    9/1995
(Continued)

OTHER PUBLICATIONS

Office Action dated Apr. 14, 2016, issued in counterpart Canadian Patent Application No. 2,886,800. (4 pages).
(Continued)

*Primary Examiner* — Timothy Vanoy
(74) *Attorney, Agent, or Firm* — Westerman, Hattori, Daniels & Adrian, LLP

(57) ABSTRACT

An air pollution control system includes: a desulfurization device which removes sulfur oxides in a flue gas generated from a boiler; a cooler which is provided at the downstream side of the desulfurization device, decreases a flue gas temperature and enlarges a particle diameter of $SO_3$ mist contained in the flue gas through cooling or heating the flue gas by a temperature adjustment means for adjusting a gas dew point temperature of the flue gas; and a $CO_2$ recovery device which includes a $CO_2$ absorber bringing $CO_2$ in the flue gas into contact with the $CO_2$ absorbent so as to remove $CO_2$ therefrom and a regenerator recovering $CO_2$ by dissociating $CO_2$ from the $CO_2$ absorbent and regenerating the
(Continued)

$CO_2$ absorbent, wherein the flue gas is cooled by a cooling unit so as to enlarge the $SO_3$ mist in the flue gas.

18 Claims, 12 Drawing Sheets

(51) Int. Cl.

| | | |
|---|---|---|
| *B01D 53/74* | (2006.01) | |
| *B01D 53/75* | (2006.01) | |
| *F23J 15/04* | (2006.01) | |
| *B01D 53/14* | (2006.01) | |
| *F23J 15/00* | (2006.01) | |
| *B01D 53/00* | (2006.01) | |
| *B01D 53/78* | (2006.01) | |
| *F23J 15/06* | (2006.01) | |

(52) U.S. Cl.
CPC ..... *B01D 53/1475* (2013.01); *B01D 53/1481* (2013.01); *B01D 53/1493* (2013.01); *B01D 53/50* (2013.01); *B01D 53/62* (2013.01); *B01D 53/78* (2013.01); *F23J 15/006* (2013.01); *F23J 15/06* (2013.01); *B01D 53/75* (2013.01); *B01D 2251/2062* (2013.01); *B01D 2251/306* (2013.01); *B01D 2251/404* (2013.01); *B01D 2251/606* (2013.01); *B01D 2252/10* (2013.01); *B01D 2252/102* (2013.01); *B01D 2252/103* (2013.01); *B01D 2252/204* (2013.01); *B01D 2252/2053* (2013.01); *B01D 2252/20494* (2013.01); *B01D 2252/30* (2013.01); *B01D 2258/0283* (2013.01); *F23J 2215/20* (2013.01); *F23J 2215/50* (2013.01); *F23J 2219/40* (2013.01); *Y02C 10/04* (2013.01); *Y02C 10/06* (2013.01)

(56) References Cited

U.S. PATENT DOCUMENTS

| | | | |
|---|---|---|---|
| 2011/0135550 A1 | 6/2011 | Nagayasu et al. | |
| 2011/0158891 A1 | 6/2011 | Nagayasu et al. | |
| 2013/0129588 A1* | 5/2013 | Johnson | B01D 53/50 423/220 |

FOREIGN PATENT DOCUMENTS

| | | | |
|---|---|---|---|
| EP | 2578293 A1 | 4/2013 | |
| JP | 03-193116 A | 8/1991 | |
| JP | 4216152 B2 | 1/2009 | |
| JP | 2011-115724 A | 6/2011 | |
| JP | 2011-136258 A | 7/2011 | |
| JP | 2015-193005 A | 11/2015 | |
| WO | 2011/152546 A1 | 12/2011 | |
| WO | 2011/152550 A1 | 12/2011 | |
| WO | WO 2011 152551 A1 * | 12/2011 | B01D 53/75 |

OTHER PUBLICATIONS

Extended (Supplementary) European Search Report (EESR) dated Apr. 21, 2016, issued in counterpart European Patent Application No. 12886392.5. (7 pages).
International Search Report dated Dec. 25, 2012, issued in corresponding application No. PCT/JP2012/076368.
Written Opinion dated Dec. 25, 2012, issued in corresponding application No. PCT/JP2012/076368.
Office Action dated Mar. 15, 2016, issued in counterpart Japanese Patent Application No. 2014-540697, with English translation. (9 pages).
Written Opinion of the International Searching Authority dated Dec. 25, 2012, issued in corresponding Application No. PCT/JP2012/076368, w/English translation. (20 pages).
Notice of Acceptance dated Sep. 28, 2016, issued in counterpart Australian Patent Application No. 2012391846. (2 pages).
Decision of a Patent Grant dated Nov. 29, 2016, issued in counterpart Japanese Patent Application No. 2014-540697, with English translation. (4 pages).

\* cited by examiner

AIR POLLUTION CONTROL SYSTEM AND AIR POLLUTION CONTROL METHOD

FIELD

The present invention relates to an air pollution control system and an air pollution control method for removing $CO_2$ in a flue gas.

BACKGROUND

In recent years, a greenhouse effect caused by $CO_2$ has been pointed out as one of factors of global warming, and a countermeasure thereof is urgently needed in worldwide in order to keep a global environment. As the generation source, $CO_2$ is generated in the action field of every person who consumes fossil fuel, and there is a tendency that the suppression of the emission is further strongly demanded. Thus, an air pollution control system and an air pollution control method for a power generation facility such as thermal power plant using a large amount of fossil fuel have been actively examined. Here, in the air pollution control system and the air pollution control method, a flue gas generated from an industrial facility such as a boiler or a gas turbine is brought into contact with an amine $CO_2$ absorbent, $CO_2$ in the flue gas is removed and recovered, and the recovered $CO_2$ is stored without being discharged to the atmosphere.

As a process of removing and recovering $CO_2$ from the flue gas by using the above-described $CO_2$ absorbent, there is disclosed a $CO_2$ recovery device including a process of bringing a flue gas into contact with a $CO_2$ absorbent in a $CO_2$ absorber (hereinafter, simply referred to as an "absorber") and a process of heating the $CO_2$ absorbent (hereinafter, simply referred to as an "absorption solution") absorbed $CO_2$ in the absorption solution regenerator (hereinafter, simply referred to as a "regenerator") so as to recover $CO_2$ and regenerating the $CO_2$ absorbent and to use the $CO_2$ absorbent again in a circulation state in the $CO_2$ absorber (for example, see Patent Literature 1).

In the $CO_2$ absorber, for example, a counter-current contact occurs by using an amine $CO_2$ absorbent such as alkanolamine, $CO_2$ in the flue gas is absorbed to the $CO_2$ absorbent by a chemical reaction (an exothermic reaction), and the flue gas from which $CO_2$ has been removed is discharged to the outside of the system. The $CO_2$ absorbent which absorbed $CO_2$ is also referred to as a rich solution. The rich solution is boosted by a pump, is heated by a heat exchanger through a high-temperature $CO_2$ absorbent (a lean solution) regenerated by recovering $CO_2$ in a regenerator, and is supplied to the regenerator.

CITATION LIST

Patent Literature

Patent Literature 1: Japanese Patent Application Laid-open No. 3-193116

SUMMARY

Technical Problem

However, when a mist generation material as a generation source for the mist generated inside the absorber of the $CO_2$ recovery device is contained in the flue gas introduced into the $CO_2$ absorber absorbing $CO_2$ in the $CO_2$ recovery device of the air pollution control system, the $CO_2$ absorbent is entrained by the mist generation material. For this reason, a problem arises in that the amount of the $CO_2$ absorbent flying away to the outside of the system increases.

When the $CO_2$ absorbent flies away to the outside of the system, the noticeable loss of the $CO_2$ absorbent used again in the regenerator occurs, and the $CO_2$ absorbent is replenished beyond necessity. For this reason, there is a need to suppress flying away of the $CO_2$ absorbent to the outside of the system.

Here, it has been desired to establish an air pollution control system that suppresses flying away of the $CO_2$ absorbent from the $CO_2$ absorber.

The invention is made in view of the above-described problems, and an object thereof is to provide an air pollution control system and an air pollution control method capable of largely suppressing the entrainment of a $CO_2$ absorbent when a flue gas, from which $CO_2$ has been removed to the outside of a system, is discharged and capable of appropriately treating the flue gas.

Solution to Problem

According to a first aspect of the present invention in order to solve the above mentioned problems, there is provided an air pollution control system including: a desulfurization device which removes sulfur oxides in a flue gas generated from a boiler; a cooler which is provided at the downstream side of the desulfurization device and decreases a flue gas temperature by enlarging a particle diameter of $SO_3$ mist contained in the flue gas while cooling or heating the flue gas by a temperature adjustment means for adjusting a gas dew point temperature of the flue gas; and a $CO_2$ recovery device which includes a $CO_2$ absorber brining $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent.

According to a second aspect of the present invention, there is provided the air pollution control system according to the first aspect, wherein a mist trapping means for trapping enlarged mist is provided near the top of the cooler.

According to a third aspect of the present invention, there is provided the air pollution control system according to the first or second aspect, wherein the temperature adjustment means is a cooling unit which includes a heat exchanger cooling cooled water circulating inside the cooler to be lower by 20° C. or more from a flue gas introduction temperature.

According to a fourth aspect of the present invention, there is provided the air pollution control system according to the first or second aspect, wherein the temperature adjustment means includes a heating unit which includes a heater heating circulation water circulated inside the cooler to be higher by 10° C. or more from the flue gas introduction temperature, and a cooling unit which is provided at the downstream side of the heating unit in the gas flow direction and cools the heated flue gas to the $CO_2$ absorber introduction temperature or less.

According to a fifth aspect of the present invention, there is provided the air pollution control system according to the first or second aspect, further including: a basic substance introduction means which is provided between the desulfurization device and the cooler so as to introduce a basic substance into the flue gas.

According to a sixth aspect of the present invention, there is provided the air pollution control system according to the first or second aspect, wherein the circulation water of the cooler is a desulfurization absorbent.

According to a seventh aspect of the present invention, there is provided an air pollution control system including: a desulfurization device which removes sulfur oxides in a flue gas generated from a boiler; a cooler which is provided at the downstream side of the desulfurization device so as to remove sulfur oxides remaining in the flue gas and to decrease a gas temperature; and a $CO_2$ recovery device which includes a $CO_2$ absorber bringing $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent, wherein the $CO_2$ absorber includes a $CO_2$ absorption unit which absorbs $CO_2$ in the flue gas containing $CO_2$ by the $CO_2$ absorbent, a primary water washing unit which is provided at the downstream side of the $CO_2$ absorption unit in the gas flow direction so as to cool the flue gas from which $CO_2$ has been removed, by washing water and to recover the entrained $CO_2$ absorbent by the washing water, a circulation line which supplies the washing water containing the $CO_2$ absorbent recovered in a liquid storage tank of the primary water washing unit from the top of the primary water washing unit so as to circulate the washing water, and a preliminary water washing unit which is provided between the $CO_2$ recovery unit and the primary water washing unit, wherein a part of the washing water containing the $CO_2$ absorbent is extracted from the primary water washing unit and the extracted washing water is supplied to the preliminary water washing unit, and wherein the $CO_2$ absorbent which is entrained in the flue gas from which $CO_2$ has been absorbed in the $CO_2$ absorption unit is preliminarily washed by the extracted washing water and a particle diameter of $SO_3$ mist containing the $CO_2$ absorbent is enlarged.

According to an eighth aspect of the present invention, there is provided the air pollution control system according to the seventh aspect, further including: a heater which heats the extracted washing water, wherein the heated washing water is supplied to the preliminary water washing unit.

According to a ninth aspect of the present invention, there is provided the air pollution control system according to the seventh or eighth aspect, further including: a mist trapping means which is provided between the preliminary water washing unit and the primary water washing unit so as to trap mist.

According to a tenth aspect of the present invention, there is provided an air pollution control system including: a desulfurization device which removes sulfur oxides in a flue gas generated from a boiler; a cooler which is provided at the downstream side of the desulfurization device and decreases a flue gas temperature by enlarging a particle diameter of $SO_3$ mist contained in the flue gas through a temperature adjustment means for adjusting a gas dew point temperature of the flue gas; and a $CO_2$ recovery device which includes a $CO_2$ absorber bringing $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent, wherein the $CO_2$ absorber includes a $CO_2$ absorption unit which absorbs $CO_2$ in the flue gas containing $CO_2$ by the $CO_2$ absorbent, a primary water washing unit which is provided at the downstream side of the $CO_2$ absorption unit in the gas flow direction so as to cool the flue gas from which $CO_2$ has been removed, by washing water, and to recover the entrained $CO_2$ absorbent by the washing water, a circulation line which supplies the washing water containing the $CO_2$ absorbent recovered in a liquid storage tank of the primary water washing unit from the top of the primary water washing unit so as to circulate the washing water, and a preliminary water washing unit which is provided between the $CO_2$ absorption unit and the primary water washing unit, wherein a part of the washing water containing the $CO_2$ absorbent is extracted from the primary water washing unit and the extracted washing water is supplied to the preliminary water washing unit, and wherein the $CO_2$ absorbent which is entrained in the flue gas from which $CO_2$ has been absorbed in the $CO_2$ absorption unit is preliminarily washed by the extracted washing water and a particle diameter of $SO_3$ mist containing the $CO_2$ absorbent is enlarged.

According to an eleventh aspect of the present invention, there is provided the air pollution control system according to tenth aspect, further including: a heater which heats the extracted washing water, wherein the heated washing water is supplied to the preliminary water washing unit.

According to a twelfth aspect of the present invention, there is provided the air pollution control system according to the tenth or eleventh aspect, further including: a mist trapping means which is provided between the preliminary water washing unit and the primary water washing unit so as to trap mist.

According to a thirteenth aspect of the present invention, there is provided the air pollution control system according to the tenth aspect, further including: a mist trapping means which is provided near the top of the cooler so as to trap enlarged mist.

According to a fourteenth aspect of the present invention, there is provided the air pollution control system according to the tenth or thirteenth aspect, wherein the temperature adjustment means is a cooling means which includes a heat exchanger cooling cooled water circulated inside the cooler to be lower by 20° C. or more from a flue gas introduction temperature.

According to a fifteenth aspect of the present invention, there is provided the air pollution control system according to the tenth or thirteenth aspect, wherein the temperature adjustment means includes a heating unit which includes a heater heating circulation water circulated inside the cooler to be higher by 10° C. or more from the flue gas introduction temperature, and a cooling unit which is provided at the downstream side of the heating unit and cools the heated flue gas to a $CO_2$ absorber introduction temperature or less.

According to a sixteenth aspect of the present invention, there is provided the air pollution control system according to the tenth or thirteenth aspect, further including: a basic substance introduction means which is provided between the desulfurization device and the cooler so as to introduce a basic substance into the flue gas.

According to a seventeenth aspect of the present invention, there is provided the air pollution control system according to the tenth or thirteenth aspect, wherein the circulation water of the cooler is a desulfurization absorbent.

According to an eighteenth aspect of the present invention, there is provided an air pollution control method including: desulfurizing sulfur oxides in a flue gas generated from a boiler by a desulfurization device; decreasing a flue gas temperature by enlarging a particle diameter of $SO_3$ mist contained in the flue gas while cooling or heating the flue gas by a temperature adjustment means for adjusting a gas dew point temperature of the flue gas; and recovering $CO_2$ by a $CO_2$ absorber bringing $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent.

According to a nineteenth aspect of the present invention, there is provided an air pollution control method including: desulfurizing sulfur oxides in a flue gas generated from a boiler; removing sulfur oxides remaining in the flue gas and decreasing a gas temperature by a cooler provided at the downstream side of a desulfurization device; and recovering $CO_2$ by a $CO_2$ absorber bringing $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent, wherein in the $CO_2$ absorber including absorbing $CO_2$ in the flue gas containing $CO_2$ by the $CO_2$ absorbent, performing a primary washing operation by a primary water washing unit which is provided at the downstream side of a $CO_2$ absorption unit in the gas flow direction so as to cool the flue gas, from which $CO_2$ has been removed by washing water, and to recover the entrained $CO_2$ absorbent by the washing water, and performing a preliminary washing operation between the $CO_2$ absorbing operation and the primary washing operation, wherein a part of the washing water containing the $CO_2$ absorbent used in the primary washing operation is extracted and the extracted washing water is supplied to the preliminary water washing unit, and wherein the $CO_2$ absorbent entrained in the flue gas from which $CO_2$ has been absorbed by the $CO_2$ absorption unit is preliminarily washed by the extracted washing water and a particle diameter of $SO_3$ mist containing the $CO_2$ absorbent is enlarged.

Advantageous Effects of Invention

According to the invention, since the particle diameter of $SO_3$ contained in the flue gas is enlarged by the temperature adjustment means for adjusting the gas dew point temperature, the enlarged $SO_3$ mist may be introduced into the absorber, and hence the enlarged mist may be trapped by the mist trapping means. As a result, it is possible to suppress the generation of the white smoke of the purified gas discharged from the absorber due to the $SO_3$ mist and to suppress the entrainment of the absorbent.

DESCRIPTION OF EMBODIMENTS

Hereinafter, the invention will be described in detail with reference to the drawings. In addition, the invention is not limited to the embodiments below. Further, the components in the embodiments below may include a component which may be easily supposed by the person skilled in the art, a component which has substantially the same configuration, and a component which is included in a so-called equivalent scope. Furthermore, the components disclosed in the embodiments below may be appropriately combined with one another.

First Embodiment

Figure 1:
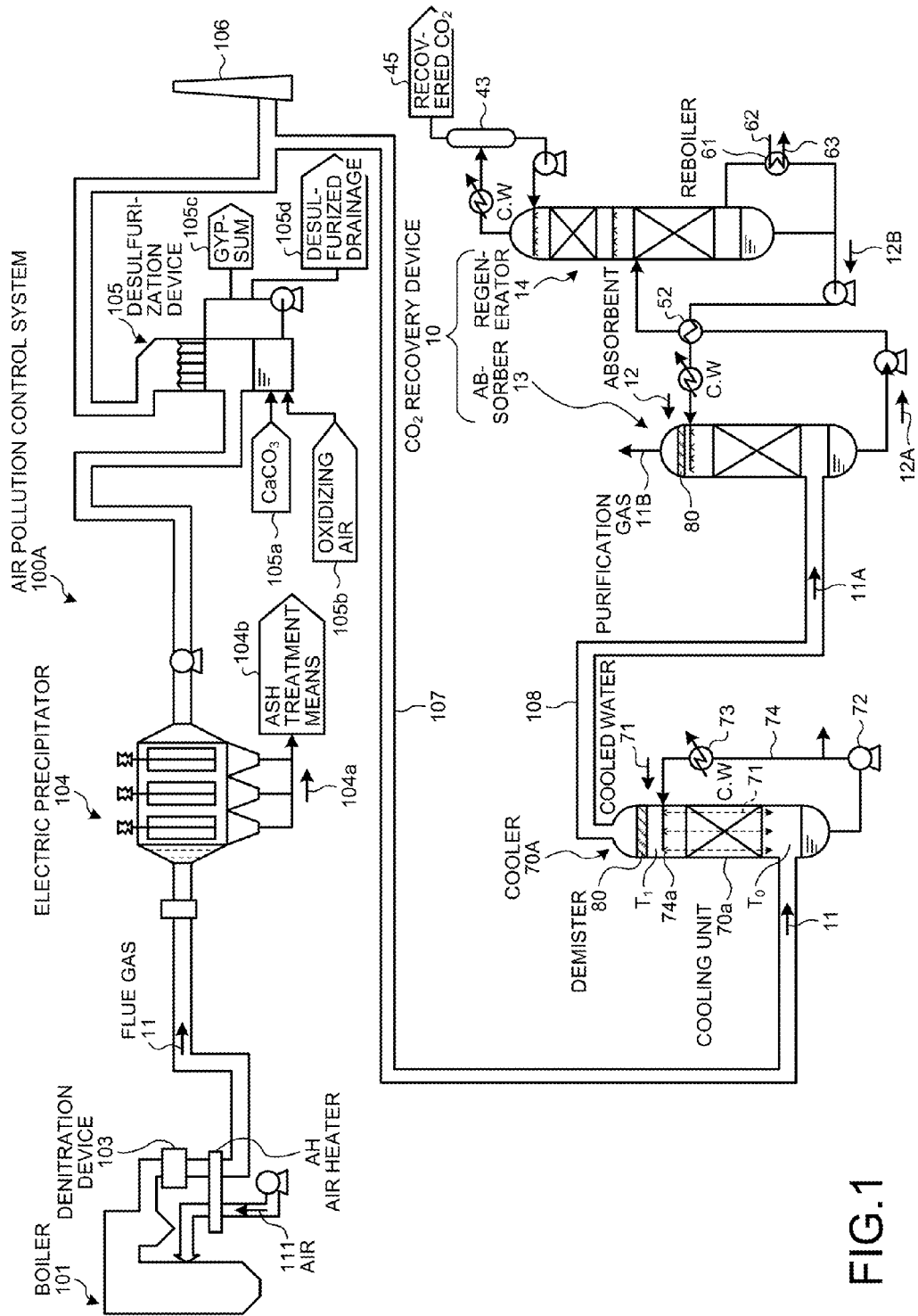
FIG. 1 is a schematic diagram illustrating an air pollution control system according to a first embodiment.

An air pollution control system and an air pollution control method according to the embodiment of the invention will be described with reference to the drawings. FIG. 1 is a schematic diagram illustrating the air pollution control system according to the first embodiment.

As illustrated in FIG. 1, an air pollution control system 100A according to the embodiment includes a desulfurization device 105 which removes sulfur oxides in a flue gas 11 generated from a boiler 101, a cooler 70A which is provided at the downstream side of the desulfurization device 105 and decreases a flue gas temperature by enlarging the particle diameter of $SO_3$ mist contained in the flue gas 11 while cooling or heating the flue gas 11 by a temperature adjustment means for adjusting the gas dew point temperature of the flue gas 11, and a $CO_2$ recovery device 10 which includes a $CO_2$ absorber (absorber) 13 removing $CO_2$ in the flue gas 11 by brining $CO_2$ into contact with the $CO_2$ absorbent and a regenerator 14 recovering $CO_2$ by dissociating $CO_2$ from the $CO_2$ absorbent and regenerating the $CO_2$ absorbent. In the embodiment, the outlet of the boiler is provided with a denitration device 103, an air heater (AH) which exchanges heat between the flue gas 11 and air 111, and an electric precipitator 104 as a dust removal means.

In FIG. 1, Reference Sign 106 indicates a stack, Reference Sign 107 indicates a flue gas introduction line which introduces the flue gas 11 from the desulfurization device 105 to the cooler 70A, and Reference Sign 108 indicates a flue gas introduction line which introduces a cooled flue gas 11A from the cooler 70A.

In the air pollution control system 100A, the flue gas 11 which is generated from the boiler 101 passes through the denitration device 103 so that nitrogen oxides (NOx) in the flue gas 11 is removed, and is first led to the air heater AH so as to heat the air 111 supplied to the boiler 101. Subsequently, the flue gas 11 is introduced into, for example, the dry-type electric precipitator 104 so that dust 104a is removed. In addition, the removed dust 104a is treated by an ash treatment means 104b.

Next, the flue gas 11 from which the dust is removed by the electric precipitator 104 passes through the desulfurization device 105 so that sulfur oxides in the flue gas 11 are removed. Here, the removed sulfur oxides become gypsum 105c by a limestone-gypsum method while lime stone ($CaCO_3$) 105a and oxidizing air 105b are supplied thereto, and desulfurized drainage 105d is separately treated.

Here, a gas temperature adjustment means of the cooler 70A according to the embodiment includes a circulation pump 72, a cooling machine 73 which corresponds to a heat exchanger, a circulation line 74 which is interposed between the circulation pump and the cooling machine, and a cooling unit 70a in which cooled water 71 flows down through nozzles 74a (as indicated by the dashed line) so as to cool the rising flue gas 11. Then, the cooled water 71 which is cooled by the cooling machine 73 is circulated through the cooling unit 70a inside the cooler 70A so as to cool the flue gas 11. In addition, the remaining water is separately discharged to the outside.

Then, the cooling temperature of the cooling machine 73 is adjusted to a desired temperature so as to decrease the temperature of the cooled water 71, and the cooled water 71 is brought into contact with the flue gas 11 which is introduced from the lower side of the cooler 70A so as to be cooled to a predetermined temperature or less (so as to be cooled to a temperature ($T_1$) of being lower by 20° C. or more from the flue gas introduction temperature ($T_0$)) so that the cooled flue gas 11A is obtained.

Here, in the invention, the flue gas 11 which is introduced while being desulfurized by the desulfurization device 105 contacts the cooled water 71 flowing down inside the cooler 70A so that the temperature of the flue gas 11 is cooled to a temperature (for example, $T_1=30°$ C.) of being lower by 20° C. or more from the introduction temperature (for example, $T_0=50°$ C.)

By the cooling operation, the dew point of the gas changes, the moisture contained in the flue gas is condensed, and the condensed moisture is taken into the $SO_3$ mist. As a result, the $SO_3$ mist is enlarged.

The enlarged $SO_3$ mist which is enlarged in the cooled flue gas 11A is trapped by using, for example, a demister 80 as the mist trapping means provided near the outlet of the cooler 70A.

As a result, the discharge amount of the $SO_3$ mist in the cooled flue gas 11A discharged from the top of the cooler 70A decreases. That is, the ratio of the number of the mist particles contained in the cooled flue gas 11A largely decreases by the temperature adjustment means as in the invention compared to the related art in which the cooling temperature of the flue gas 11 introduced into the cooler does not decrease to be lower by 20° C. or more from the introduction temperature.

As a result, since the amount of the $SO_3$ mist introduced into the $CO_2$ absorber 13 decreases, the $SO_3$ mist inside the $CO_2$ absorber 13 is further enlarged. Accordingly, the $SO_3$ mist which is enlarged (for example, by about 1.0 μm) is trapped by the demister 80 provided near the outlet of the $CO_2$ absorber 13.

Figure 10:
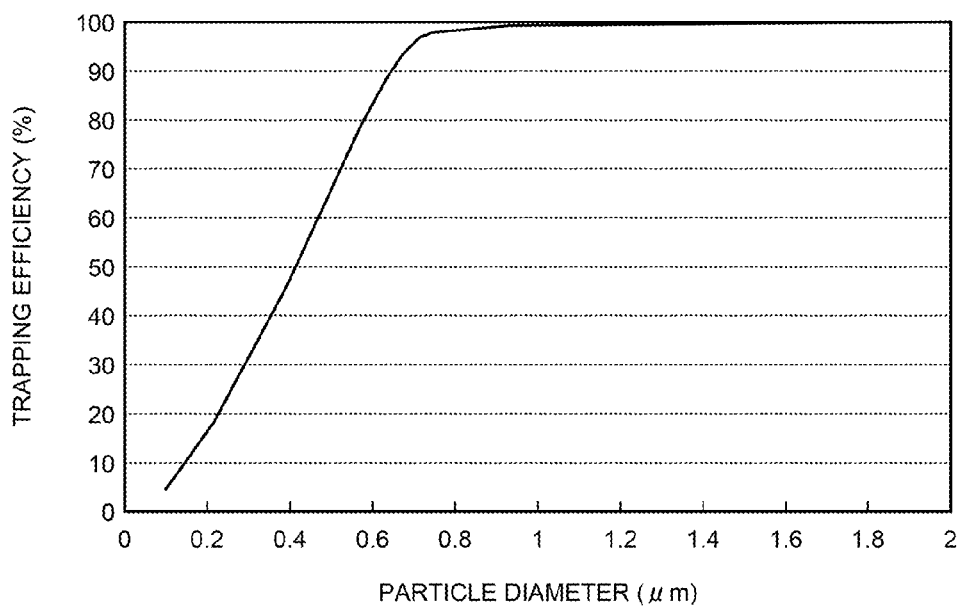
FIG. 10 is a diagram illustrating a relation between a mist particle diameter (μm) and mist trapping efficiency (%) when a demister is used.

FIG. 10 is a diagram illustrating a relation between the mist particle diameter (μm) and the mist trapping efficiency (%) when the demister is used.

According to FIG. 10, it is observed that 90% or more of mist is trapped when the mist particle diameter becomes 0.65 μm or more.

In addition, the mist particle diameter was measured based on the dust measurement (JIS K0302).

From the description above, since the flue gas temperature is controlled at the gas dew point temperature as the temperature lower than the introduction temperature by the temperature adjustment means of the cooler 70A, the particle diameter of the $SO_3$ mist is enlarged, the enlarged mist is trapped by the demister 80 provided near the outlet of the cooler 70A, and hence the amount of the $SO_3$ mist introduced into the $CO_2$ absorber 13 of the $CO_2$ recovery device 10 decreases.

Further, in the embodiment, a case has been described in which the demister 80 is provided, but the invention is not limited thereto. For example, the demister 80 may not be provided.

When the demister 80 is not provided, the enlarged $SO_3$ mist is introduced into the $CO_2$ absorber 13. As a result, since the ratio of the enlarged $SO_3$ mist increases compared to the related art and hence the enlarged $SO_3$ mist is further enlarged, the $SO_3$ is trapped by the demister 80 provided near the outlet of the absorber 13.

As described above, according to the invention, since the $SO_3$ mist is trapped in the cooler, the mist introduction amount with respect to the absorber 13 largely decreases. As a result, it is possible to suppress the generation of white smoke of a purified gas 11B discharged from the absorber 13 due to the $SO_3$ mist and to suppress the entrainment of an absorbent 12.

As a result, it is possible to provide the air pollution control system in which the loss of the absorbent 12 is extremely small.

Here, in the embodiment, an amine absorbent is exemplified as the absorbent 12, but the absorbent of the invention is not limited to the amine absorbent. As the absorbent, for example, an ammonia absorbent, an amino-acid absorbent, an ionic liquid absorption solution, and a hot potassium carbonate absorption solution including potassium carbonate and amine may be exemplified other than the amine absorption solution.

Further, in FIG. 1, Reference Sign 61 indicates a reboiler which regenerates the absorbent 12, Reference Sign 62 indicates saturated steam supplied to the reboiler, Reference Sign 63 indicates condensed water, Reference Sign 43 indicates a separation drum, Reference Sign 45 indicates a recovered $CO_2$ gas (recovered $CO_2$), and Reference Sign 52 indicates a heat exchanger which exchanges heat between an absorbent (a rich solution 12A) which absorbs $CO_2$ and a regenerated $CO_2$ absorbent (a lean solution 12B).

Next, a temperature adjustment means which decreases the temperature of the flue gas 11 in the cooler 70A and a mechanism which enlarges the $SO_3$ mist contained in the flue gas 11 by the adjustment of the temperature will be further described.

Figure 9:
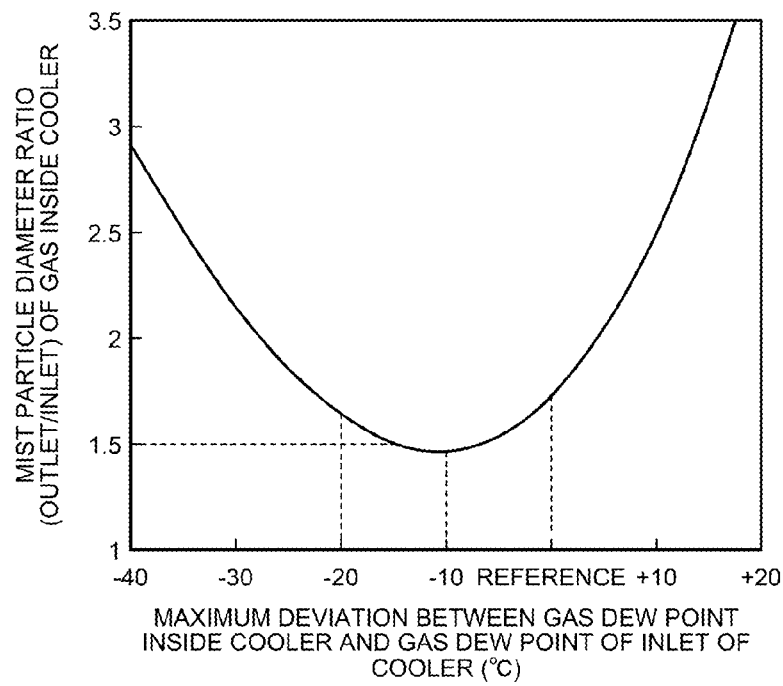
FIG. 9 is a diagram illustrating a relation between a maximum deviation (° C.) between a gas dew point inside a cooler and a gas dew point at an inlet of the cooler and a mist particle diameter ratio (outlet/inlet) of a gas inside the cooler.

FIG. 9 is a diagram illustrating a relation between a maximum deviation (° C.) between the gas dew point inside the cooler and the gas dew point at the inlet of the cooler and the mist particle diameter ratio (outlet/inlet) of the gas inside the cooler.

In FIG. 9, the gas temperature of the flue gas 11 introduced into the cooler is set as a reference.

When the gas temperature ($T_1$) is decreased to be lower by 20° C. or more from the reference introduction gas temperature ($T_0$), the mist particle diameter ratio increases, and hence the mist is enlarged.

In the invention, a cooling means including a heat exchanger cooling the flue gas to be lower by 20° C. or more from the flue gas introduction temperature (the reference) is provided.

Figure 11:
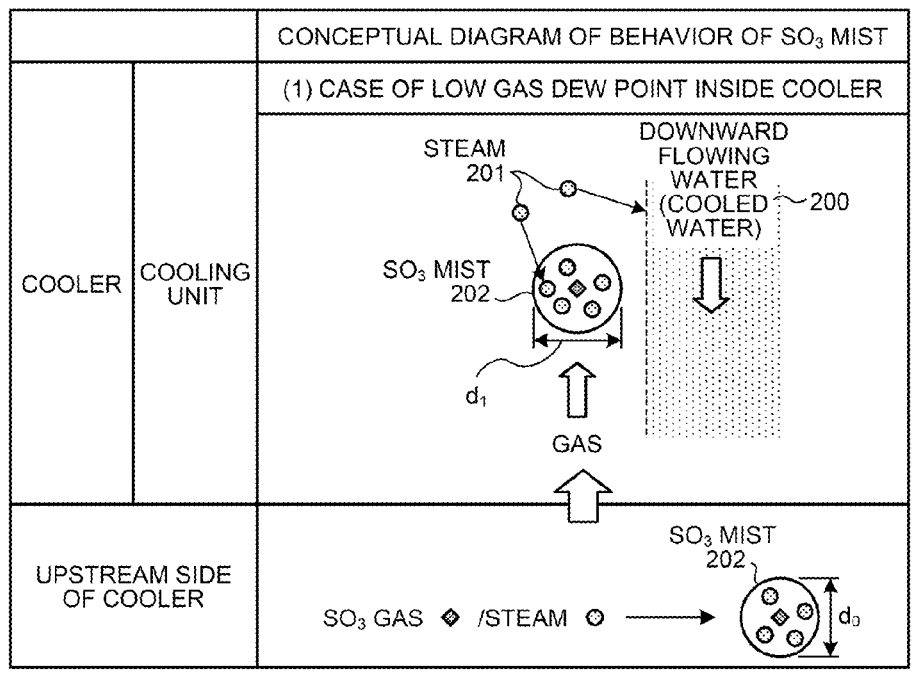
FIG. 11 is a conceptual diagram illustrating the behavior of $SO_3$ mist in a flue gas generated by a cooling operation.

FIG. 11 is a conceptual diagram illustrating the behavior of the $SO_3$ mist in the flue gas due to the cooling operation.

In FIG. 11, $SO_3$ mist 202 is generated from the $SO_3$ gas and the moisture in the flue gas 11 at the upstream side of the cooler in the gas temperature condition of the acid dew point or less, and a certain degree of the $SO_3$ mist 202 is contained in the flue gas 11.

In this state, the flue gas 11 is introduced into the cooler 70A at the introduction gas temperature ($T_0$), and the flue gas 11 is cooled to a predetermined temperature or less. That is, when the dew point of the gas inside the cooler 70A becomes smaller than the dew point of the inlet gas (be lower by 20° C. or more) by the cooling of downward flowing water 200 as the cooled water circulated inside the cooler 70A as illustrated in FIG. 11, moisture 201 in the gas is condensed by the downward flowing water 200 and the $SO_3$ mist 202.

As a result, since the condensed moisture 201 is taken into the $SO_3$ mist 202, a particle diameter $d_1$ of the $SO_3$ mist 202 in the cooled flue gas becomes larger than a particle diameter $d_0$ of the $SO_3$ mist in the flue gas at the inlet, and hence the $SO_3$ mist 202 in the flue gas 11 is enlarged.

In the invention, a medium circulated inside the cooler 70A is set as the cooled water, but the invention is not limited to the cooled water. For example, the desulfurization may be performed at a high-degree depth by using the desulfurization absorbent in which the cooled water has a desulfurization function.

That is, it is possible to further remove remaining sulfur oxides desulfurized to a predetermined value or less by the desulfurization device 105 so that the cooler 70A also has a function as a desulfurizer at the downstream side of the desulfurization device 105. Accordingly, it is possible to cope with a case in which the amount of sulfur oxides mixed with the $CO_2$ absorbent decreased or the flue gas emission regulation is strict.

Here, as the desulfurization absorbent, for example, sodium hydroxide, potassium hydroxide, potassium carbonate, sodium carbonate, and the like may be exemplified, but the invention is not limited thereto as long as a desulfurization action is ensured.

As illustrated in FIG. 1, the air pollution control method of the embodiment includes desulfurizing sulfur oxides in the flue gas 11 generated from the boiler 101 by the desulfurization device 105, decreasing the gas temperature by enlarging the particle diameter of the $SO_3$ mist contained in the flue gas 11 while cooling the desulfurized flue gas 11 to be lower by 20° C. or more from the introduction temperature thereof by using the temperature adjustment means for adjusting the gas dew point temperature of the flue gas, and recovering $CO_2$ by using the absorber 13 bringing $CO_2$ in the flue gas 11A cooled by the cooling operation into contact with the $CO_2$ absorbent 12 so as to remove $CO_2$ therefrom and the regenerator 14 recovering $CO_2$ by dissociating $CO_2$ from the $CO_2$ absorbent and regenerating the $CO_2$ absorbent.

As a result, the temperature of the flue gas 11 is cooled to the temperature of being lower by 20° C. or more (for example, $T_1=30°$ C.) of the flue gas 11 from the introduction temperature (for example, $T_0=50°$ C.) of the flue gas 11 by the cooled water 71 flowing downward inside the cooler 70A.

The gas dew point changes by the cooling operation, the moisture contained in the flue gas is condensed, and the condensed moisture is taken into the $SO_3$ mist. As a result, the $SO_3$ mist is enlarged.

The enlarged mist is trapped by the demister 80.

As described above, according to the invention, since the $SO_3$ mist is trapped by the cooling operation, the mist introduction amount in the $CO_2$ absorption operation using the absorber 13 largely decreases. As a result, it is possible to suppress the generation of white smoke of the purified gas 11B discharged from the absorber 13 due to the $SO_3$ mist and to suppress the entrainment of the absorbent 12.

As a result, it is possible to provide the air pollution control method in which the loss of the absorbent 12 is extremely small.

Second Embodiment

Figure 2:
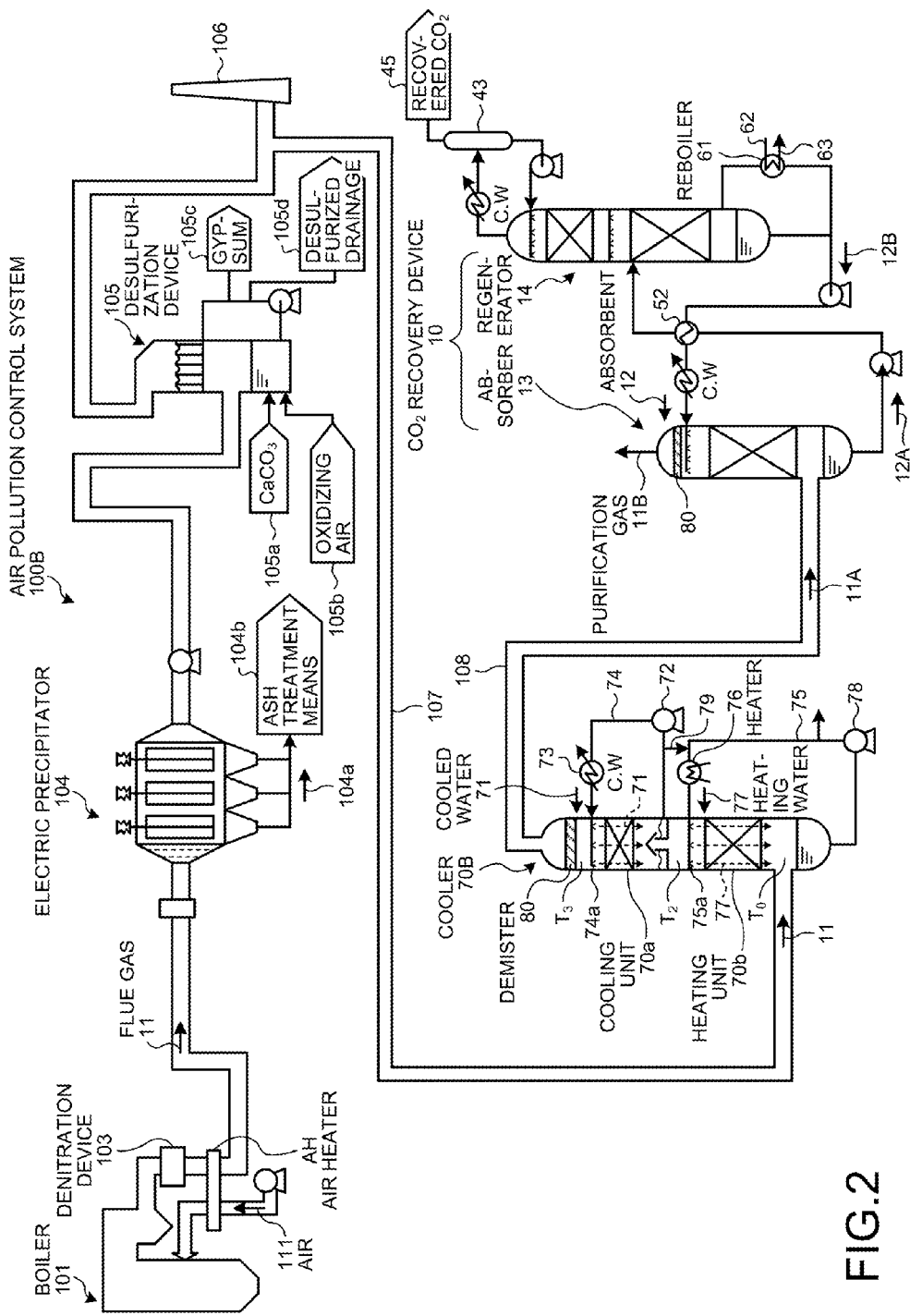
FIG. 2 is a schematic diagram illustrating an air pollution control system according to a second embodiment.

An air pollution control system and an air pollution control method according to the embodiment of the invention will be described with reference to the drawings. FIG. 2 is a schematic diagram illustrating the air pollution control system according to the second embodiment. In addition, the same reference sign will be given to the same component as the first embodiment, and the description thereof will not be presented.

As illustrated in FIG. 2, an air pollution control system 100B according to the embodiment includes a cooler 70B which is provided at the downstream side of the desulfurization device 105 similarly to the first embodiment.

The cooler 70B enlarges the particle diameter of the $SO_3$ mist contained in the flue gas 11 by the temperature adjustment means for adjusting the gas dew point temperature.

Here, in the embodiment, the temperature adjustment means includes a heating unit 70b which includes a heater 76 heating the circulation water circulated inside the cooler 70B to be higher by 10° C. or more from the flue gas introduction temperature and the cooling unit 70a which is provided at the downstream side of the heating unit 70b in the gas flow direction and cools the heated flue gas to the introduction temperature or less of the absorber 13.

In addition, a part of the residual cooled water 71 is supplied from the circulation line 74 of the cooling unit 70a to a circulation line 75 through a line 79. Further, the residual water is separately discharged to the outside.

In the heating unit 70b, heating water 77 is heated to a predetermined temperature by the heater 76 which heats the water circulated through the circulation line 75 by a circulation pump 78.

Here, as the heat source used in the heater 76, the waste heat steam inside the plant or the residual heat inside the $CO_2$ recovery device 10 may be used.

Then, in the heating unit 70b, the heating water 77 is brought into contact with the introduced flue gas 11 so as to heat the flue gas 11, and the heated flue gas is cooled by the cooling unit 70a which is provided at the downstream side of the heating unit 70b in the gas flow direction so that the flue gas is cooled to a temperature suitable for the introduction to the absorber 13 which is provided at the rear stage.

Here, in the invention, the flue gas 11 which is introduced after being desulfurized by the desulfurization device 105 contacts the heating water 77 which flows down through the heating unit 70b of the cooler 70B so that the temperature of the flue gas 11 is heated to a temperature of being higher by 10° C. or more (for example, $T_2=60°$ C.) from the introduction temperature (for example, $T_0=50°$ C.)

By the heating operation, the moisture of the downward flowing heating water 77 evaporates, and the moisture in the gas is raised. As a result, the moisture is condensed to the $SO_3$ mist in the flue gas so as to enter the $SO_3$ mist (that is, the $SO_3$ mist is diluted by the moisture). As a result, the $SO_3$ mist is enlarged (for example, by about 1.0 μm).

The flue gas 11 which contains the enlarged $SO_3$ mist is cooled to a predetermined temperature by the cooling unit 70a. For example, the flue gas is cooled to, for example, a temperature ($T_3=40°$ C.) lower by 10° C. than the temperature (for example, $T_0=50°$ C.) of the flue gas at the inlet by the cooling unit 70a. Subsequently, the enlarged $SO_3$ mist in the flue gas is trapped by, for example, the demister 80 as the mist trapping means provided near the outlet of the cooler 70B. As a result, the discharged amount of the $SO_3$ mist in the cooled flue gas 11A discharged from the head of the cooler 70B decreases. That is, the ratio of the number of the mist particles contained in the cooled flue gas 11A largely decreases compared to the case where the temperature of the flue gas 11 introduced into the cooler 70B is not set to by higher by 10° C. or more from the introduction temperature by the temperature adjustment means as in the invention.

As a result, since the number of the $SO_3$ mist particles introduced into the $CO_2$ absorber 13 decreases, the $SO_3$ mist is further enlarged inside the $CO_2$ absorber 13. Accordingly, the enlarged $SO_3$ mist is trapped by the demister 80 which is provided near the outlet of the $CO_2$ absorber 13.

As described above, since the flue gas temperature is controlled at the gas dew point temperature higher than the introduction temperature by the temperature adjustment means of the cooler 70B, the particle diameter of the $SO_3$ mist is enlarged. Accordingly, the enlarged mist is trapped by the demister 80 provided near the outlet of the cooler 70B, and hence the introduction amount of the $SO_3$ mist to the $CO_2$ recovery device 10 is decreased.

Further, although not illustrated in the drawings in the embodiment, a configuration may be employed in which the demister 80 as the mist trapping means is provided between the heating unit 70b and the cooling unit 70a, the enlarged $SO_3$ mist is trapped by the demister, and the flue gas is cooled to a predetermined temperature. That is, a configuration may be employed in which the flue gas 11 is heated so as to enlarge the $SO_3$ mist in the flue gas, the enlarged $SO_3$ mist is trapped by the demister 80, and the flue gas from which the $SO_3$ mist is removed is cooled to a temperature ($T_3=40°$ C.) of, for example, about lower by 10° C. from the introduction gas temperature ($T_0=50°$ C.) at the inlet of the cooler 70B of the flue gas 11 so that the temperature becomes the introduction temperature of the absorber 13.

Next, the temperature adjustment means which increases the temperature of the flue gas 11 at the cooler 70B and the mechanism which enlarges the $SO_3$ mist contained in the flue gas 11 by the adjustment of the temperature will be further described.

FIG. 9 is a diagram illustrating a relation between the maximum deviation (° C.) between the gas dew point inside the cooler and the gas dew point at the inlet of the cooler and the mist particle diameter ratio (outlet/inlet) of the gas inside the cooler.

In FIG. 9, the gas temperature of the flue gas 11 which is introduced into the cooler is set as a reference.

When the flue gas is heated to be higher by 10° C. or more from the reference gas temperature, the mist particle diameter ratio increases, and hence the mist is further enlarged.

In the first embodiment, the flue gas is actively cooled so as to enlarge the $SO_3$ mist, but in the embodiment, the flue gas 11 is actively heated so as to enlarge the $SO_3$ mist.

In the invention, the flue gas is heated to be higher by 10° C. or more from the flue gas introduction temperature (the reference) by the heating means.

Figure 12:
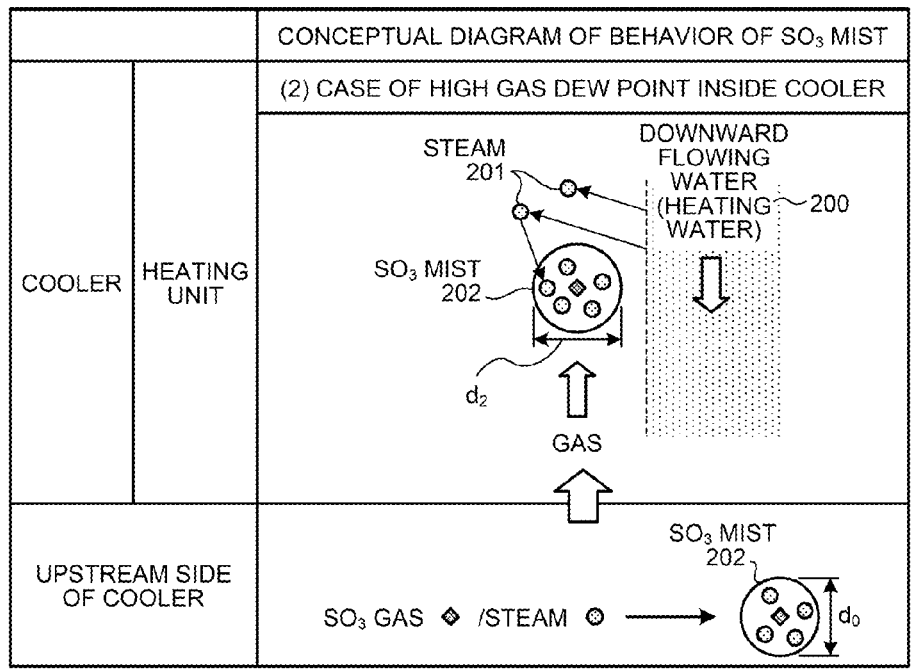
FIG. 12 is a conceptual diagram illustrating the behavior of $SO_3$ mist in a flue gas generated by a heating operation.

FIG. 12 is a conceptual diagram illustrating the behavior of the $SO_3$ mist in the flue gas due to the heating operation.

In FIG. 12, the $SO_3$ mist 202 is generated from $SO_3$ gas and moisture at the upstream side of the cooler in the gas temperature condition of the acid dew point or less, and a certain degree of the $SO_3$ mist 202 is contained in the flue gas 11.

In this state, when the flue gas 11 is introduced into the cooler 70B and is heated to a predetermined temperature or more by the heating unit 70b, as illustrated in FIG. 12, the gas dew point in the heating unit 70b inside the cooler 70B becomes higher (by being higher by 10° C. or more) than the dew point of the inlet gas by the downward flowing water 200 as the heating water 77 circulated inside the heating unit 70b of the cooler 70B. As a result, the moisture further evaporates from the heated downward flowing water 200. Thus, the condensed moisture 201 is taken into the $SO_3$ mist 202 (that is, the $SO_3$ mist is diluted by the moisture). Therefore, the $SO_3$ mist is enlarged. Accordingly, the particle diameter $d_2$ of the $SO_3$ mist 202 becomes larger than the particle diameter $d_0$ of the $SO_3$ mist 202 at the inlet, and hence the $SO_3$ mist 202 is enlarged.

The enlarged mist is trapped by the demister 80 similarly to the first embodiment.

As described above, according to the invention, since the $SO_3$ mist is trapped in the cooler 70B, the mist introduction amount to the absorber largely decreases. As a result, it is possible to suppress the generation of white smoke of the purified gas 11B discharged from the absorber 13 due to the $SO_3$ mist and to suppress the entrainment of the absorbent 12.

As a result, it is possible to provide the air pollution control system in which the loss of the absorbent 12 is extremely small.

As illustrated in FIG. 2, the air pollution control method of the embodiment includes: desulfurizing sulfur oxides in the flue gas 11 generated from the boiler 101 by the desulfurization device 105, increasing the gas temperature by enlarging the particle diameter of the $SO_3$ mist contained in the flue gas while heating the desulfurized flue gas 11 to be higher by 10° C. or more from the introduction temperature by the temperature adjustment means for adjusting the gas dew point temperature, cooling the heated flue gas, and recovering $CO_2$ by the absorber 13 bringing $CO_2$ in the flue gas 11A cooled by the cooling operation into contact with the $CO_2$ absorbent 12 so as to remove $CO_2$ therefrom and the regenerator 14 recovering $CO_2$ by dissociating $CO_2$ from the $CO_2$ absorbent and regenerating the $CO_2$ absorbent.

As a result, the flue gas 11 is heated by the heating water 77 flowing down inside the cooler 70B at the front stage of the cooling operation so that the temperature of the flue gas becomes the temperature (for example, $T_2=60°$ C.) of being higher by 10° C. or more from the introduction temperature (for example, $T_1=50°$ C.)

The gas dew point changes by the heating operation, and the moisture evaporates from the downward flowing water. Thus, the moisture contained in the flue gas is condensed, and the condensed moisture is taken into the $SO_3$ mist. As a result, the $SO_3$ mist is enlarged. Subsequently, the heated flue gas is cooled to the introduction temperature or less of the absorber 13 by the cooling unit 70a.

The enlarged mist is trapped by the demister 80 similarly to the first embodiment.

As described above, according to the invention, since the $SO_3$ mist is trapped by the cooling operation, the mist introduction amount in the $CO_2$ absorption operation using the absorber 13 largely decreases. As a result, it is possible to suppress the generation of white smoke of the purified gas 11B discharged from the absorber 13 due to the $SO_3$ mist and to suppress the entrainment of the absorbent 12.

As a result, it is possible to provide the air pollution control method in which the loss of the absorbent 12 is extremely small.

Third Embodiment

Figure 3:
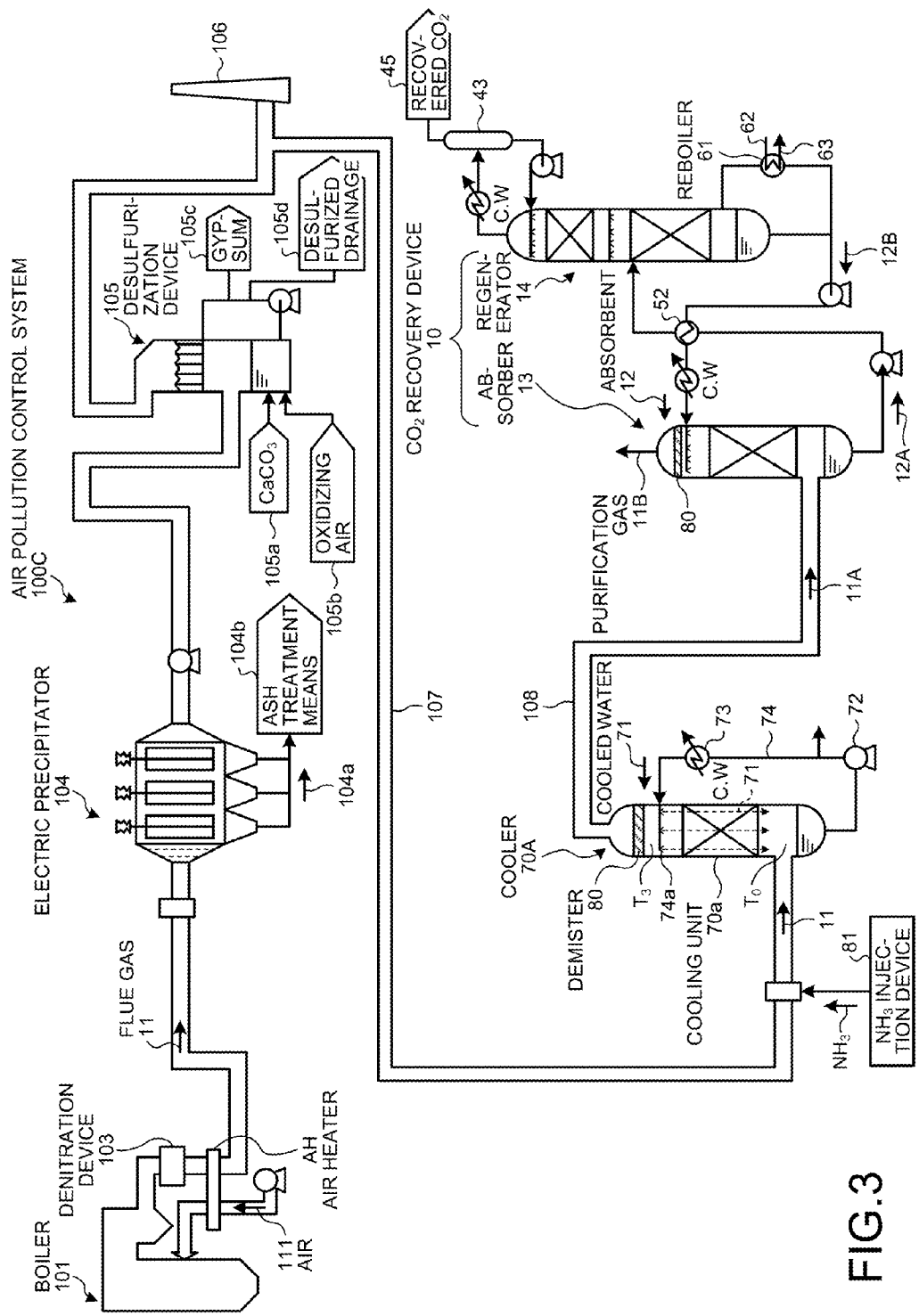
FIG. 3 is a schematic diagram illustrating an air pollution control system according to a third embodiment.

An air pollution control system and an air pollution control method according to the embodiment of the invention will be described with reference to the drawings. FIG. 3 is a schematic diagram illustrating the air pollution control system according to the third embodiment. In addition, the same reference sign will be given to the same component as the first embodiment, and the description thereof will not be presented.

As illustrated in FIG. 3, an air pollution control system 100C according to the embodiment has a configuration in which the air pollution control system 100A of the first embodiment further includes a basic substance introduction means which is provided between the desulfurization device 105 and the cooler 70A so as to supply ammonia ($NH_3$) as a basic substance into the flue gas 11.

Here, in the embodiment, the cooled water is cooled to about lower by 10° C. from the introduction temperature similarly to the related art, but may be cooled to be lower by 20° C. or more similarly to the first embodiment.

By the introduction of ammonia, the salt concentration of the $SO_3$ mist in the flue gas 11 is increased before the flue gas is taken into the cooler 70A. As a result of an increase in salt concentration, the moisture is taken so as to dilute the salt concentration in the cooling unit 70a of the cooler 70A, and hence the mist may be enlarged.

In the embodiment, ammonia is used as the basic substance, but the invention is not limited thereto. For example, low-grade amine such as volatile amine may be used.

Further, since the drainage of the cooled water of the embodiment includes ammonia or low-grade amine, a separate drainage treatment means is used to make harmless the drainage when there is a regulation in drainage, and then the harmless drainage is discharged.

The enlarged mist is trapped by the demister 80 similarly to the first embodiment.

As described above, according to the invention, since the basic substance is introduced into the flue gas port at the upstream side of the cooler 70A, the $SO_3$ mist may be trapped, and hence the mist introduction amount to the absorber 13 largely decreases. As a result, it is possible to suppress the generation of white smoke of the purified gas 11B discharged from the absorber 13 due to the $SO_3$ mist and to suppress the entrainment of the absorbent 12.

As a result, it is possible to provide the air pollution control system in which the loss of the absorbent 12 is extremely small.

Further, a desulfurization device which circulates a desulfurization absorbent may be provided at the downstream side of the cooling unit 70a in the flue gas flow direction.

Further, the temperature adjustment means of the first embodiment or the second embodiment may be used in combination.

Fourth Embodiment

Figure 4:
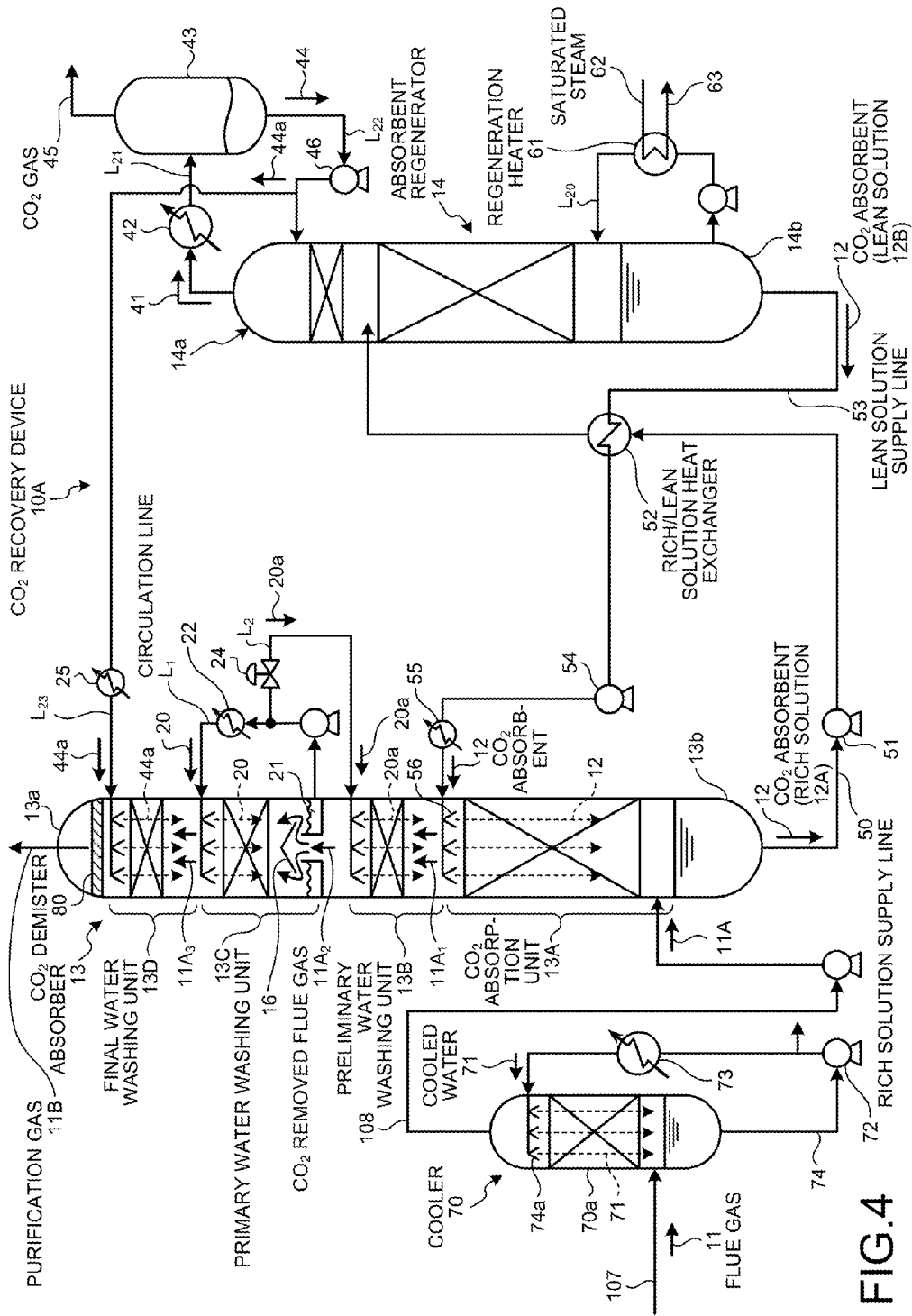
FIG. 4 is a schematic diagram illustrating a $CO_2$ recovery device of an air pollution control system according to a fourth embodiment.

An air pollution control system and an air pollution control method according to the embodiment of the invention will be described with reference to the drawings. FIG. 4 is a schematic diagram illustrating the $CO_2$ recovery device of the air pollution control system according to the fourth embodiment. In addition, the same reference sign will be given to the same component as the first embodiment, and the description thereof will not be presented.

As illustrated in FIG. 4, a $CO_2$ recovery device 10A of the air pollution control system according to the embodiment includes a desulfurization device which removes sulfur oxides in a flue gas generated from a boiler, a cooler 70 which is provided at the downstream side of the desulfurization device so as to remove sulfur oxides remaining in the flue gas and to decrease the gas temperature, and the $CO_2$ recovery device 10A which includes the absorber 13 bringing $CO_2$ in the flue gas into contact with the $CO_2$ absorbent so as to remove $CO_2$ therefrom and the regenerator 14 recovering $CO_2$ by dissociating $CO_2$ from the $CO_2$ absorbent 12 and regenerating the $CO_2$ absorbent 12.

Then, in the embodiment, the $CO_2$ absorber 13 includes a $CO_2$ absorption unit 13A which absorbs $CO_2$ in the flue gas containing $CO_2$ by the $CO_2$ absorbent 12, a primary water washing unit 13C which is provided at the downstream side of the $CO_2$ absorption unit 13A in the gas flow direction so as to cool the flue gas from which $CO_2$ has been removed by the washing water 20 and to recover the entrained $CO_2$ absorbent by the washing water 20, a circulation line $L_1$ which supplies the washing water 20 containing the $CO_2$ absorbent recovered by a liquid storage tank 21 of the primary water washing unit 13C from the top of the primary water washing unit 13C in a circulation state, and a preliminary water washing unit 13B which is provided between the $CO_2$ absorption unit 13A and the primary water washing unit 13C. Then, a part 20a of the washing water 20 containing the $CO_2$ absorbent is extracted from the primary water washing unit 13C through a line $L_2$, and the extracted washing water is supplied to the preliminary water washing unit 13B. Subsequently, the $CO_2$ absorbent which is entrained in the flue gas absorbing $CO_2$ in the $CO_2$ absorption unit is preliminarily washed by the extracted washing water, the particle diameter of the $SO_3$ mist containing the $CO_2$ absorbent is enlarged, and the preliminary washing water used for the preliminary washing operation is caused to directly flow to the $CO_2$ absorption unit 13A.

In addition, the circulation line $L_1$ is provided with a cooling unit 22 so that the washing water is cooled to a predetermined temperature (for example, 40° C. or less). Further, the extraction amount of the washing water 20 is adjusted by an adjustment valve 24.

In the embodiment, the part 20a of the washing water 20 containing the $CO_2$ absorbent is extracted from the circulation line $L_1$, but the invention is not limited thereto. For example, a storage unit may be separately provided so as to store a part 20a of the washing water 20 containing the $CO_2$ absorbent from the circulation line $L_1$, and the washing water may be extracted from the storage unit.

Next, a mechanism which enlarges the $SO_3$ mist 202 contained in the flue gas of the $CO_2$ absorber 13 will be described.

Figure 13:
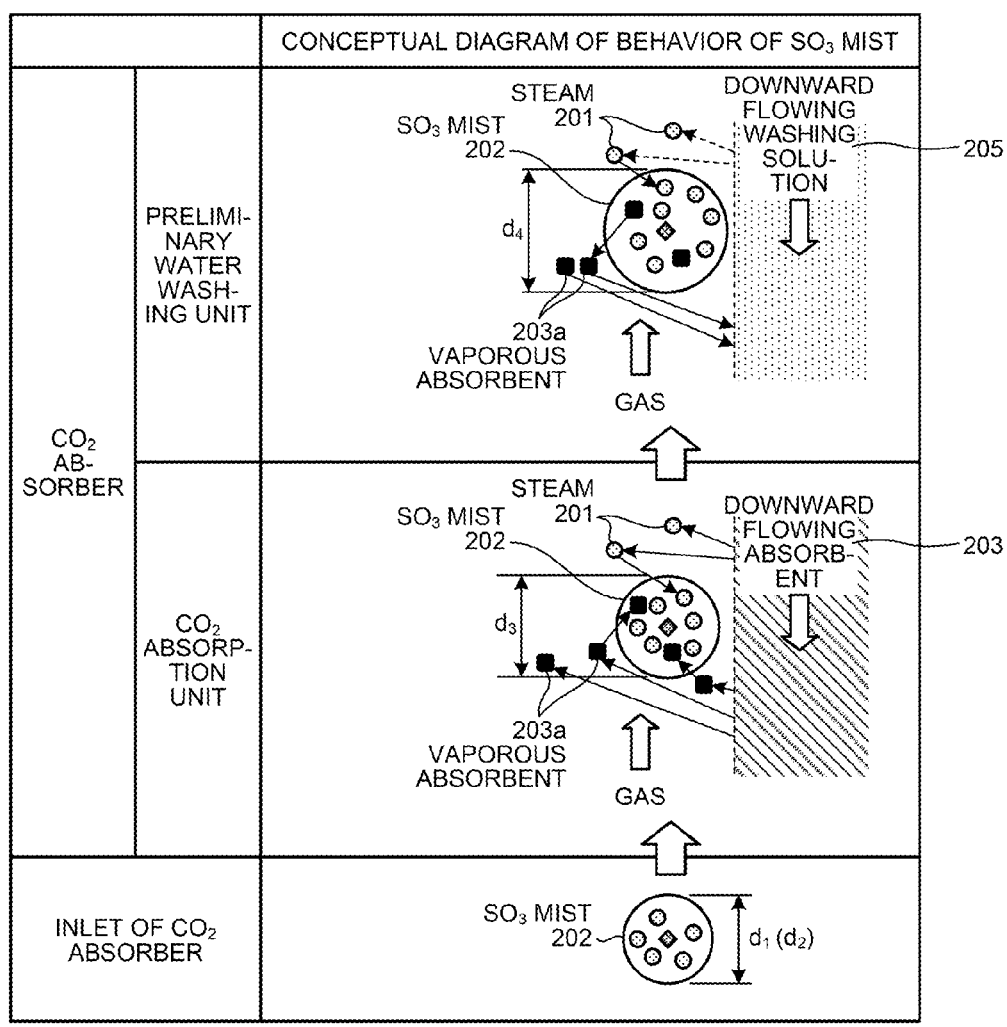
FIG. 13 is a conceptual diagram illustrating the behavior of $SO_3$ mist in a flue gas in a $CO_2$ absorption unit and a preliminary water washing unit.

FIG. 13 is a conceptual diagram illustrating the behavior of the $SO_3$ mist in the flue gas of the $CO_2$ absorption unit and the preliminary water washing unit.

In FIG. 13, the $SO_3$ mist 202 is generated at the inlet of the $CO_2$ absorber 13 from a $SO_3$ gas and moisture at the upstream side of the cooler in the gas temperature condition of the acid dew point or less, and a certain degree of the $SO_3$ mist 202 is contained in the flue gas 11 passing through the cooler.

First, in the $CO_2$ absorption unit 13A, the $SO_3$ mist which does not contain the absorbent behaves so as to have the composition of a downward flowing absorbent 203, and a vaporous absorbent 203a in the gas evaporating from the downward flowing absorbent 203 is absorbed into the $SO_3$ mist 202. Accordingly, the gaseous moisture 201 evaporating from the downward flowing absorbent is also condensed into the $SO_3$ mist, and hence the $SO_3$ mist 202 is enlarged. Accordingly, the particle diameter $d_3$ of the $SO_3$ mist 202 becomes larger than the particle diameter $d_1$ ($d_2$) of the $SO_3$ mist 202 at the inlet of the $CO_2$ absorber 13, and hence the $SO_3$ mist 202 is enlarged.

Next, in the preliminary water washing unit 13B, the $SO_3$ mist which contains a comparatively high concentration of absorbent behaves so as to have the composition of a downward flowing washing solution 205 containing a low concentration of absorbent, the absorbent is recovered from the $SO_3$ mist into the flue gas, the moisture in the gas of which the material moves fast is condensed to the $SO_3$ mist, and the moisture 201 is taken into the $SO_3$ mist 202 (that is, the $SO_3$ mist is diluted by the moisture). As a result, the $SO_3$ mist is enlarged. Accordingly, the particle diameter $d_4$ of the $SO_3$ mist 202 becomes larger than the particle diameter $d_3$ of the $SO_3$ mist 202 passing through the $CO_2$ absorption unit 13A, and the $SO_3$ mist 202 is enlarged.

The enlarged mist is trapped by the demister 80 provided near the top of the $CO_2$ absorption unit 13.

In the embodiment, a final water washing unit 13D is provided at the top 13a of the primary water washing unit 13C so as to remove the $CO_2$ absorbent in the flue gas. Then, the flue gas is washed by the washing water 44a, passes through the demister 80, and is discharged as the purified gas 11B from the top 13a to the outside.

The cooled gas 11A which is introduced into the $CO_2$ absorber 13 contacts the absorbent 12 in the $CO_2$ absorption unit 13A so as to remove $CO_2$ in the flue gas, and is introduced as a flue gas $11A_1$ into the preliminary water washing unit 13B.

In the preliminary water washing unit 13B, the mist particle diameter is enlarged, and the enlarged mist grows in the flue gas.

The flue gas in which the $SO_3$ mist is enlarged is introduced as a flue gas $11A_2$ to the primary water washing unit 13C through a chimney tray 16. Here, the entrained absorbent 12 is removed by washing the flue gas.

The washed flue gas is introduced as a flue gas $11A_2$ to the final water washing unit 13D. Here, the flue gas is washed finally so as to further remove the residual absorbent 12.

Then, the flue gas which passes through the final water washing unit 13D passes through the demister 80 so as to trap the dust and the enlarged $SO_3$ mist in the flue gas, and the purified purification gas 11B is discharged from the top 13a to the outside.

As described above, according to the embodiment, since the $SO_3$ mist is enlarged inside the $CO_2$ absorber 13 and is trapped by the demister 80, it is possible to suppress the generation of white smoke of the purified gas 11B discharged from the absorber 13 due to the $SO_3$ mist and to suppress the entrainment of the absorbent 12.

As a result, it is possible to provide the air pollution control system in which the loss of the absorbent 12 is extremely small.

The rich solution 12A which absorbs $CO_2$ is boosted by a rich solvent pump 51 interposed in a rich solution supply line 50, is heated by the lean solution 12B regenerated by the absorbent regenerator 14 in the rich/lean solution heat exchanger 52, and is supplied to a top 14a of the absorbent regenerator 14.

The rich solution 12A which is discharged from the top 14a of the regenerator 14 into the regenerator dissociates most of $CO_2$ while being heated by the steam generated from the bottom 14b of the regenerator. The $CO_2$ absorbent 12 from which a part or the entirety of $CO_2$ is dissociated inside the regenerator 14 is referred to as a "semi-lean solution". The semi-lean solution which is not illustrated in the drawings becomes the lean solution 12B from which most of $CO_2$ has been removed when the semi-lean solution flows down to the bottom 14b of the regenerator 14. The lean solution 12B is heated by a saturated steam 62 in a reboiler 61 interposed in a circulation line $L_{20}$. The heating saturated steam 62 becomes condensed water 63.

Meanwhile, a $CO_2$ gas 41 which entrains the steam generated from the rich solution 12A and the semi-lean solution (not illustrated) is discharged from the top 14a of the regenerator 14.

Then, the $CO_2$ gas 41 which entrains the steam is derived by a gas discharge line $L_{21}$, the moisture is condensed by a condenser 42 interposed in the gas discharge line $L_{21}$, a condensed water 44 is separated in a separation drum 43, a $CO_2$ gas 45 is discharged to the outside of the system, and a post process such as a compression process and a recovery process is separately performed.

The condensed water 44 which is separated in the separation drum 43 is cooled by a cooling unit 25 and is supplied to the top of the absorbent regenerator 14 by a condensed water circulation pump 46 interposed in a condensed water line $L_{23}$.

Although not illustrated in the drawings, a part of the condensed water 44 may be supplied to the circulation line $L_1$ of the washing water 20 containing the $CO_2$ absorbent 12, and may be used to absorb the $CO_2$ absorbent 12 entrained by the flue gas from which $CO_2$ has been removed.

The regenerated $CO_2$ absorbent (the lean solution 12B) 12 is fed to the $CO_2$ absorber 13 by a lean solution pump 54 through a lean solution supply line 53, and is used as the $CO_2$ absorbent 12 in a circulation state. At this time, the lean solution 12B is cooled to a predetermined temperature by a cooling unit 55, and is supplied into the $CO_2$ absorption unit 13A through a nozzle 56.

Thus, the $CO_2$ absorbent 12 forms a closed circulation line to circulate the $CO_2$ absorber 13 and the absorbent regenerator 14, and is used again as the $CO_2$ absorption unit 13A of the $CO_2$ absorber 13. In addition, the $CO_2$ absorbent 12 is supplied by a replenish line (not illustrated) if necessary, and the $CO_2$ absorbent is regenerated by a reclaimer (not illustrated) if necessary.

As illustrated in FIG. 4, the air pollution control method of the embodiment includes absorbing $CO_2$ by using the $CO_2$ absorption unit 13A which absorbs $CO_2$ in the flue gas containing $CO_2$ by the $CO_2$ absorbent in the $CO_2$ absorber 13, performing a primary water washing operation by the primary water washing unit 13C which is provided at the downstream side of the $CO_2$ absorption unit in the gas flow direction so as to cool the flue gas from which $CO_2$ has been removed by the circulated washing water 20 and to recover the entrained $CO_2$ absorbent by the washing water 20, and performing a preliminary water washing operation by the preliminary water washing unit 13B between the $CO_2$ absorption operation and the primary water washing operation.

Then, a part 20a of the circulated washing water 20 containing the $CO_2$ absorbent used in the primary water washing operation is extracted, the extracted washing water is supplied to the preliminary water washing unit 13B, the $CO_2$ absorbent entrained in the flue gas absorbing $CO_2$ by the $CO_2$ absorption unit 13A is preliminarily washed by the extracted washing water, the particle diameter of the $SO_3$ mist containing the $CO_2$ absorbent is enlarged, and the preliminary washing water used for the preliminary water washing operation is caused to directly flow down to the $CO_2$ absorption unit.

The enlarged mist is trapped by the demister 80 near the top 13a.

As described above, according to the invention, since the mist is enlarged by increasing the particle diameter of the $SO_3$ mist in the preliminary water washing operation, the mist is reliably trapped by the demister 80. Accordingly, it is possible to suppress the generation of white smoke of the purified gas 11B discharged from the absorber 13 due to the $SO_3$ mist and to suppress the entrainment of the absorbent 12.

As a result, it is possible to provide the air pollution control method in which the loss of the absorbent 12 is extremely small.

Fifth Embodiment

Figure 5:
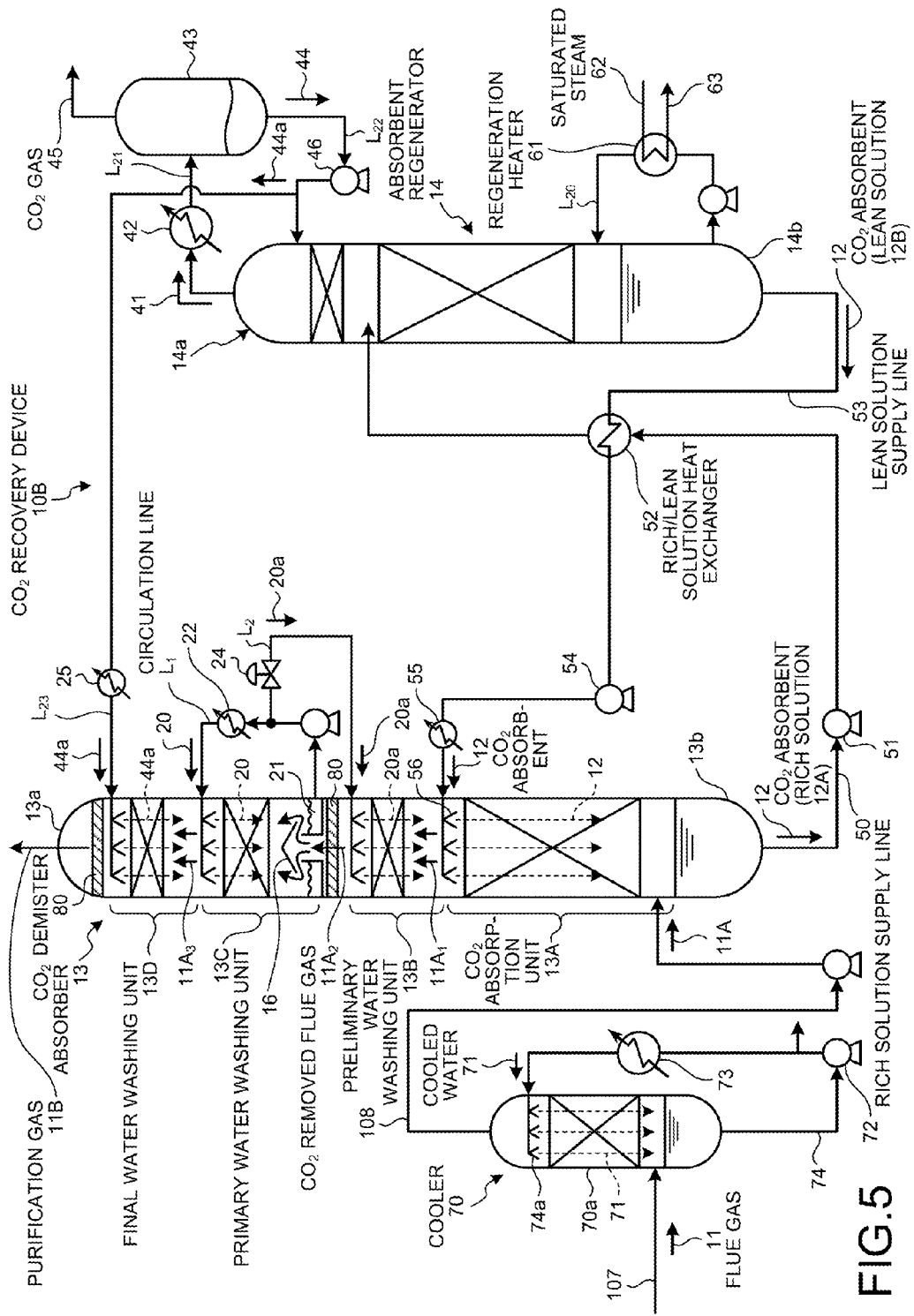
FIG. 5 is a schematic diagram illustrating a $CO_2$ recovery device of an air pollution control system according to a fifth embodiment.

An air pollution control system and an air pollution control method according to the embodiment of the invention will be described with reference to the drawings. FIG. 5 is a schematic diagram illustrating the $CO_2$ recovery device of the air pollution control system according to the fifth embodiment. In addition, the same reference sign will be given to the same component as the first and fourth embodiments, and the description thereof will not be presented.

As illustrated in FIG. 5, a $CO_2$ recovery device 10B of the air pollution control system according to the embodiment has a configuration in which the $CO_2$ recovery device 10A of the fourth embodiment includes the demister 80 as the mist trapping means between the preliminary water washing unit 13B and the primary water washing unit 13C.

As described in the fourth embodiment, since the $SO_3$ mist contained in the flue gas is enlarged in the preliminary water washing unit 13B, the enlarged $SO_3$ mist is trapped by the demister 80 which is separately provided in the intermediate portion before the enlarged $SO_3$ mist is trapped by the demister 80 provided at the top 13a.

As a result, since the enlarged $SO_3$ mist is trapped, the number of the $SO_3$ mist particles introduced into the primary water washing unit 13C decreases. As a result, the $SO_3$ mist of the primary water washing unit 13C is further enlarged. Accordingly, the amount of the $SO_3$ mist which is enlarged (for example, by about 1.0 μm) is increased by the demister 80 which is provided near the outlet of the $CO_2$ absorber 13.

Sixth Embodiment

Figure 6:
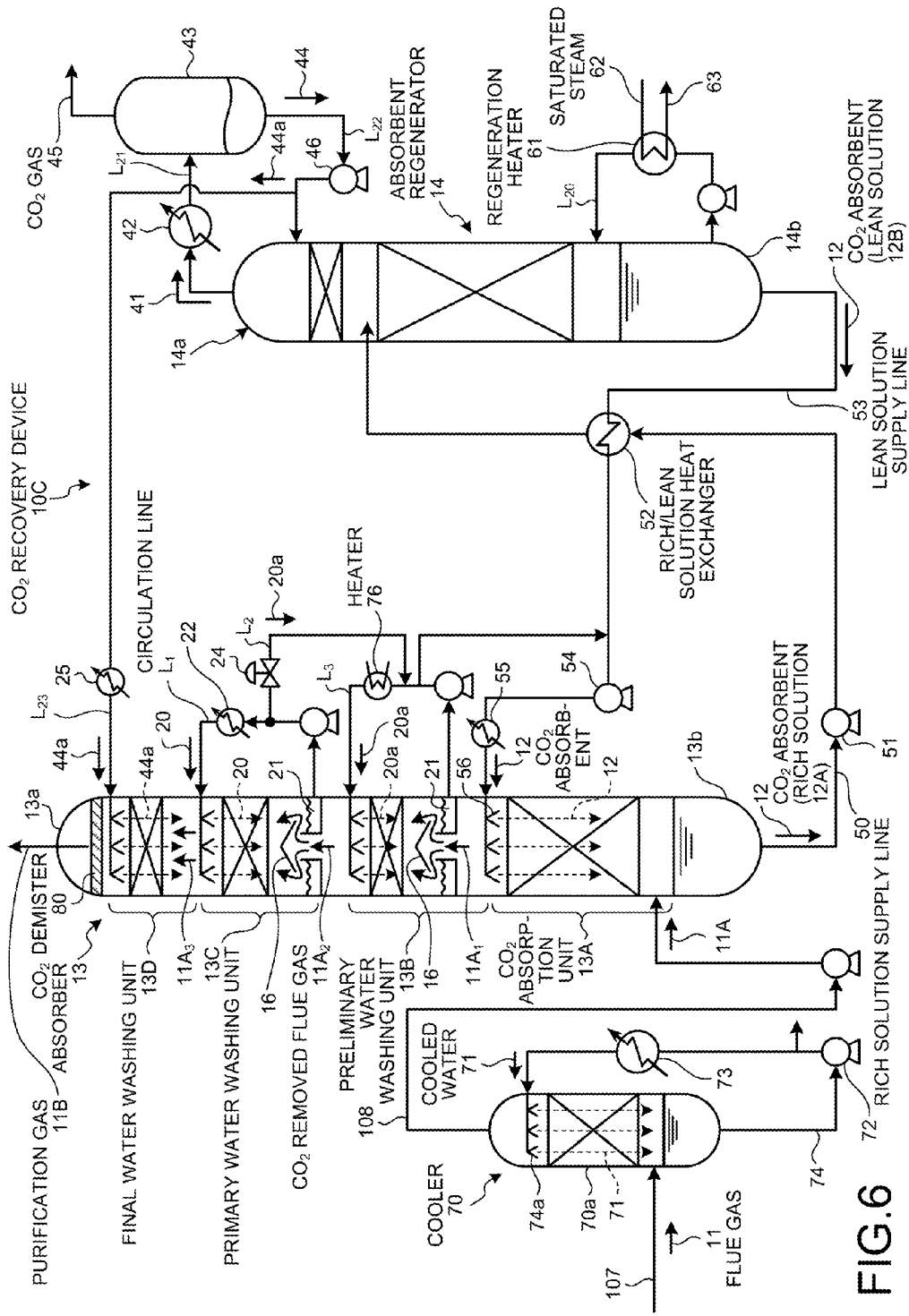
FIG. 6 is a schematic diagram illustrating a $CO_2$ recovery device of an air pollution control system according to a sixth embodiment.

An air pollution control system and an air pollution control method according to the embodiment of the invention will be described with reference to the drawings. FIG. 6 is a schematic diagram illustrating the $CO_2$ recovery device of the air pollution control system according to the sixth embodiment. In addition, the same reference sign will be given to the same component as the first and fourth embodiments, and the description thereof will not be presented.

As illustrated in FIG. 6, a $CO_2$ recovery device 10C of the air pollution control system according to the embodiment has a configuration in which a part of the washing water 20 extracted through the extraction line $L_2$ is introduced into the circulation line $L_3$ for washing the preliminary water washing unit 13B in the $CO_2$ recovery device 10A of the fourth embodiment. Then, the heater 76 which heats the introduced washing water is provided.

Then, the extracted washing water 20a is heated by the heater 76, and the heated washing water is supplied to the preliminary water washing unit 13B.

It is desirable that the heating temperature be, for example, a temperature (55 to 65° C.) of be higher by 5° C. or more of the temperature (for example, 50 to 60° C.) of the extracted washing water.

Seventh Embodiment

Figure 7:
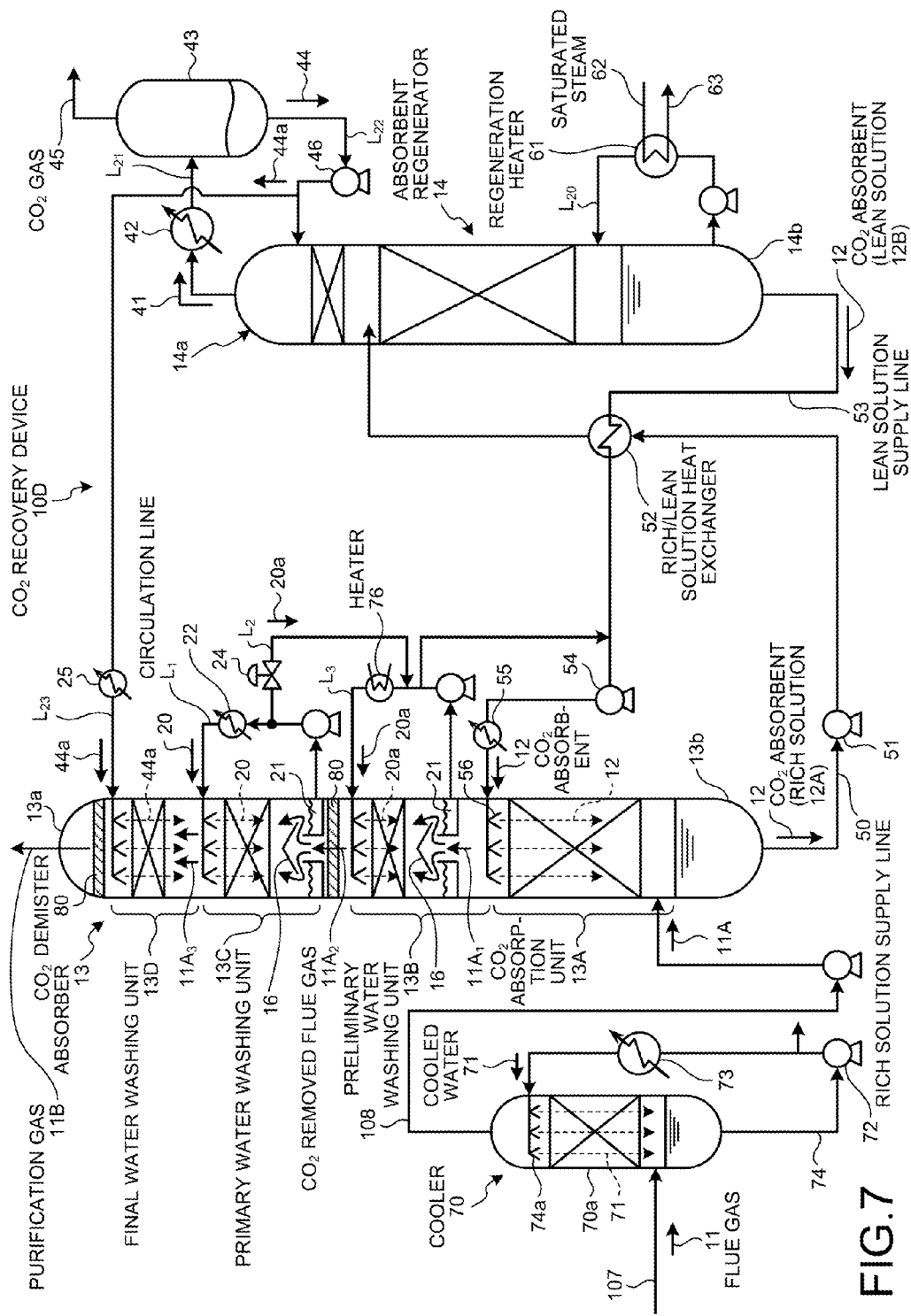
FIG. 7 is a schematic diagram illustrating a $CO_2$ recovery device of an air pollution control system according to a seventh embodiment.

An air pollution control system and an air pollution control method according to the embodiment of the invention will be described with reference to the drawings. FIG. 7 is a schematic diagram illustrating the $CO_2$ recovery device of the air pollution control system according to the seventh embodiment. In addition, the same reference sign will be given to the same component as the first, fourth, and sixth embodiments, and the description thereof will not be presented.

As illustrated in FIG. 7, a $CO_2$ recovery device 10D of the air pollution control system according to the embodiment has a configuration in which the demister 80 as the mist trapping means is provided between the preliminary water washing unit 13B and the primary water washing unit 13C of the $CO_2$ recovery device 10C of the sixth embodiment.

As described in the fourth embodiment, since the $SO_3$ mist contained in the flue gas is enlarged in the preliminary water washing unit 13B, the enlarged $SO_3$ mist is trapped by the demister 80 provided at the intermediate portion before the enlarged $SO_3$ mist is trapped by the demister 80 provided at the top 13a.

As a result, since the enlarged $SO_3$ mist is trapped, the number of the $SO_3$ mist particles introduced into the primary water washing unit 13C decreases. As a result, the $SO_3$ mist is further enlarged in the primary water washing unit 13C. Accordingly, the trapping amount of the $SO_3$ mist which is enlarged (for example, by about 1.0 μm) using the demister 80 provided near the outlet of the $CO_2$ absorber 13 increases.

Eighth Embodiment

Figure 8:
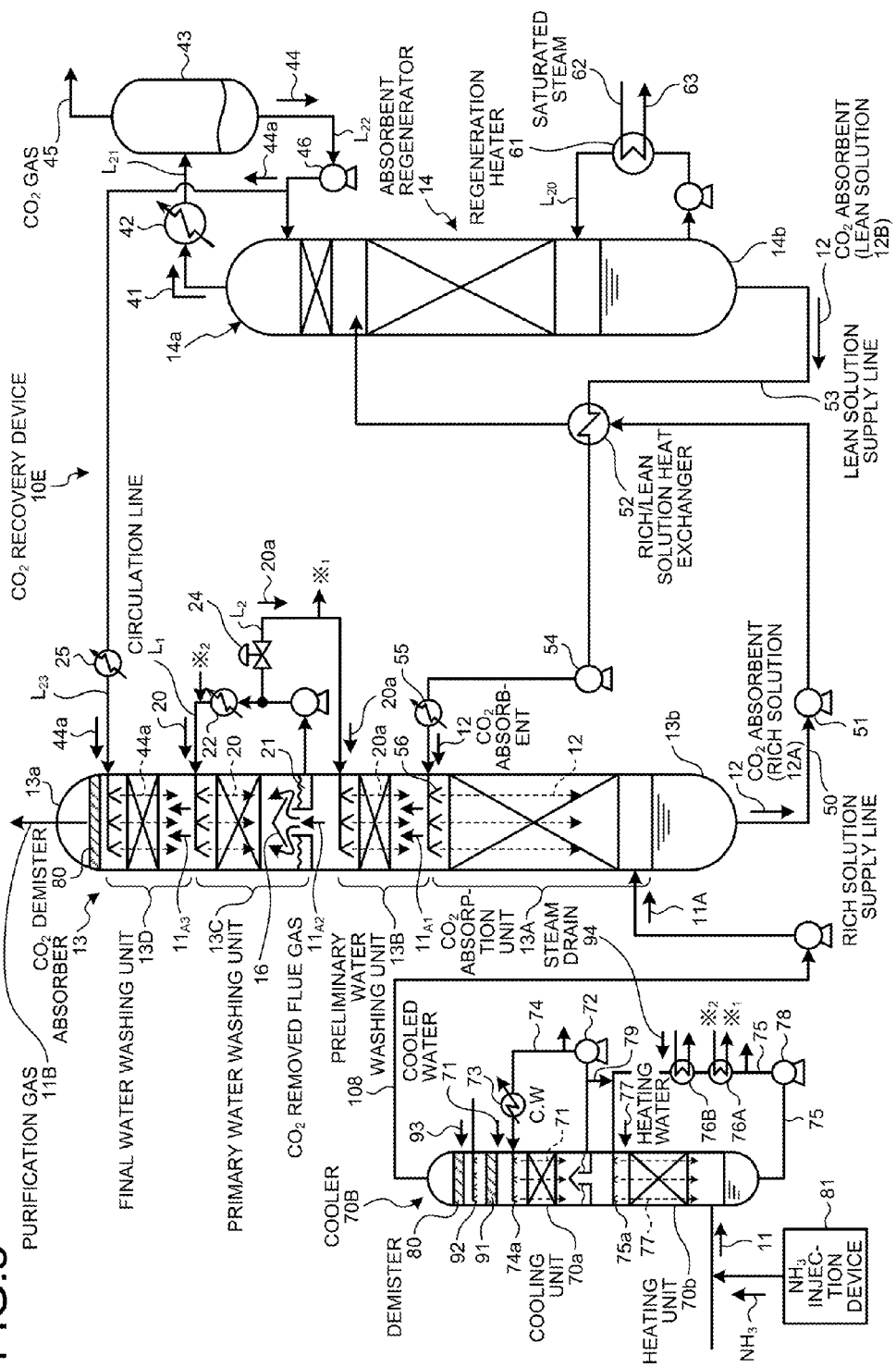
FIG. 8 is a schematic diagram illustrating a $CO_2$ recovery device of an air pollution control system according to an eighth embodiment.

An air pollution control system and an air pollution control method according to the embodiment of the invention will be described with reference to the drawings. FIG. 8 is a schematic diagram illustrating the $CO_2$ recovery device of the air pollution control system according to the eighth embodiment. In addition, the same reference sign will be given to the same component as the first, second, and fourth embodiments, and the description thereof will not be presented.

As illustrated in FIG. 8, a $CO_2$ recovery device 10E of the air pollution control system according to the embodiment has a configuration in which the cooler at the front stage of the $CO_2$ absorber 13 in the $CO_2$ recovery device 10A of the fourth embodiment is provided in the cooler 70B of the second embodiment.

Further, ammonia is injected from an ammonia injection device 81 into the flue gas 11 introduced into the cooler 70B so as to increase the salt concentration of the flue gas.

Further, in the cooler 70B of the embodiment, a packed bed 91 is provided between the cooling unit 70a and the demister 80.

The packed bed 91 is used to preliminarily remove the $SO_3$ mist having a large particle diameter or the dust in the flue gas.

Since the dust in the flue gas 11 is not directly trapped by the demister 80 due to the installation of the packed bed 91, the demister 80 may be protected, and hence the demister may be safely operated for a long period of time.

When clogging is generated in the packed bed 91 by the adhesion of dust, washing water 93 is sprayed from a washing nozzle 92 of a washing means provided in the demister 80 so as to remove the dust or the like.

Further, in the embodiment, as a means for heating the heating unit 70b, a part of the circulated washing water of the primary water washing unit 13C inside the $CO_2$ absorber 13 is extracted (*1), and is used as a heat source of a heater 76A interposed in the circulation line 75 of the heating unit 70b. In addition, the washing water used for the heat exchange operation is returned again (*2).

Further, when the heating operation is not sufficient in the heater 76A, a heater 76B which introduces steam drain 94 supports to produce the heating water 77 through a circulation line 75.

Further, the heat source for the heater 76 is not limited thereto. For example, a part of the $CO_2$ gas 45 dissociated from the regenerator 14 may be extracted from the gas discharge line $L_{21}$ so as to be used as a heat source or compression heat in a compressor generated in the recovery operation may be used as a heat source.

Example A

In Table 1, a test was performed at 40° C. lower by 10° C. than 50° C. of the inlet temperature of the cooler in the related art.

Example 1 is a case where a cooling operation was performed at 24° C. lower than the introduction gas temperature corresponding to the first embodiment.

Example 2 is a case where a heating operation was performed at +11° C. higher than the introduction gas temperature corresponding to the second embodiment.

Example 3 is a case where ammonia was injected as the introduction gas corresponding to the third embodiment.

The mist particle diameter ratio (outlet mist particle diameter/inlet mist particle diameter) based on the reference was 1.4. Based on the reference (1) of 1.4, the ratio of the number of the mist particles was compared by the comparison of the gas property and the gas state at the outlet of the cooler.

As a result, in Example 1, a value was small so as to be 0.8 times the reference.

Further, in Example 2, a value was very small so as to be 0.5 times the reference.

Further, in Example 3, a value was small so as to be 0.8 times the reference.

Further, the gas was introduced into the absorber 13, and the gas property and the gas state of the purified gas 11B at the outlet of the absorber 13 were compared.

The comparison result is also illustrated in Table 1.

TABLE 1

| Item | | Related art | Example 1 | Example 2 | Example 3 |
|---|---|---|---|---|---|
| Control of mist particle diameter | | No | Yes (deviation between gas dew point inside cooler and gas dew point at inlet of cooler) | | Yes (contact between basic substance and flue gas containing a mist generation material in the mist form at upstream side of cooler) |
| Difference (maximum value) between gas dew point inside cooler and gas dew point at inlet of cooler | | −10° C. | −24° C. | +11° C. | −10° C. |
| Comparison of gas property and gas state at outlet of cooler | Mist particle diameter ratio (outlet/inlet) | 1.4 | 1.8 | 2.3 | 1.8 |
| | Ratio of number of mist particles [related art as reference: 1] | 1 (Reference) | 0.8 | 0.5 | 0.8 |
| Comparison of gas property and gas state at outlet of absorber [related art as reference: 1] | Mist particle diameter ratio | 1 (Reference) | 1.5 | 1.8 | 3.7 |
| | Ratio of amount of absorbent discharged to outside of system while being entrained with mist | 1 (Reference) | 0.2 | Value smaller than 0.1 | Value smaller than 0.1 |

As illustrated in Table 1, the mist particle diameter ratio at the outlet of the absorber of Example 1 was increased 1.5 times the reference. Further, the ratio of the amount of the absorbent discharged to the outside of the system while being entrained with the mist from the outlet of the absorber of Example 1 was largely decreased 0.2 times the reference.

Further, as illustrated in Table 1, the mist particle diameter ratio of the outlet of the absorber of Example 2 was increased 1.8 times the reference. Further, the ratio of the amount of the absorbent discharged to the outside of the system while being entrained with the mist from the outlet of the absorber of Example 2 was further largely decreased so as to be smaller than 0.1 times the reference compared to Example 1.

Further, as illustrated in Table 1, the mist particle diameter ratio at the outlet of the absorber of Example 3 was increased 3.7 times the reference. Further, the ratio of the amount of the absorbent discharged to the outside of the system while being entrained with the mist from the outlet of the absorber of Example 3 was largely decreased so as to be smaller than 0.1 times the reference compared to Example 1.

Figure 14:
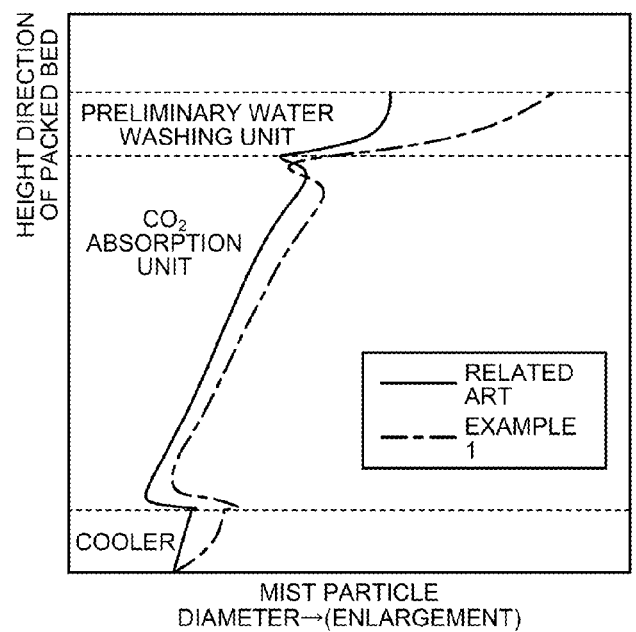
FIG. 14 is a diagram illustrating an enlargement tendency of a cooler and a $CO_2$ absorption unit in the gas flow direction with respect to a $SO_3$ mist particle diameter of the first embodiment.

FIG. 14 is a diagram illustrating the enlargement tendency of the cooling unit and the $CO_2$ absorption unit in the gas flow direction with respect to the $SO_3$ mist particle diameter of Example 1 corresponding to the first embodiment.

As illustrated in FIG. 14, when the mist of which the mist particle diameter is enlarged by the cooler 70A is taken into the $CO_2$ absorber 13, first, the particle diameter is further enlarged in the height direction of the packed bed in the $CO_2$ absorption unit 13A.

Next, the enlarged mist was further enlarged in the preliminary water washing unit 13B.

In addition, the composition of the mist temporarily changes due to a change in mist particle diameter at the boundary between the cooler 70A and the $CO_2$ absorption unit 13A and the boundary between the $CO_2$ absorption unit 13A and the preliminary water washing unit 13B.

Example B

In Table 2, a test was performed based on the state where the mist particle diameter was not adjusted in the water washing unit of the $CO_2$ absorber in the related art.

Example 4 is a case where the mist is enlarged in the preliminary water washing unit corresponding to the fourth embodiment and is trapped by the demister at the top.

Example 5 is a case where the mist is enlarged and heated in the preliminary water washing unit corresponding to the sixth embodiment and is trapped by the demister at the top.

Example 6 is a case where the mist is enlarged and heated in the preliminary water washing unit corresponding to the seventh embodiment and is trapped by the demister at the top while the demister is provided between the preliminary water washing unit and the primary water washing unit.

The comparison result is illustrated in Table 2.

TABLE 2

| Item | | Related art | Example 4 | Example 5 | Example 6 |
|---|---|---|---|---|---|
| Control of mist particle diameter | | No | Yes (adjustment of mist particle diameter in water washing unit) | | |
| Specific plan of water washing unit | | — | Preliminary water washing unit/demister | Washing operation by heated and circulated water + washing operation by cooled and circulated water/demister | Washing operation by heated and circulated water/demister + washing operation by cooled and circulated water/demister |
| Demister for removing mist of target (pressure loss of 30 to 300 mmAq) Installation number | | Reference | Reference + 1 | Reference | Reference + 1 |
| Comparison of gas property and gas state at outlet of preliminary water washing unit [related art as reference: 1] | Mist particle diameter ratio | 1 (Reference) | 1.1 | 1.1 | 1.1 |
| Comparison of gas property and gas state at outlet of absorber [related art as reference: 1] | Ratio of amount of absorbent discharged to outside of system while being entrained with mist | 1 (Reference) | Value smaller than 0.1 | 0.5 | Value smaller than 0.1 |

As illustrated in Table 2, the mist particle diameter ratio of the outlet of the preliminary water washing unit of Example 4 was increased 1.1 times the reference. Further, the ratio of the absorbent discharged to the outside of the system while being entrained with the mist at the outlet of the absorber of Example 4 was largely decreased so as to be smaller than 0.1 times the reference.

As illustrated in Table 2, the mist particle diameter ratio of the outlet of the preliminary water washing unit of Example 5 was increased 1.1 times the reference. Further, the ratio of the amount of the absorbent discharged to the outside of the system while being entrained with the mist from the outlet of the absorber of Example 5 was largely decreased 0.5 times the reference.

As illustrated in Table 2, the mist particle diameter ratio of the outlet of the preliminary water washing unit of Example 6 was increased 1.1 times the reference. Further, the ratio of the amount of the absorbent discharged to the outside of the system while being entrained with the mist from the outlet of the absorber in Example 6 was largely decreased so as to be 0.1 times the reference.

Figure 15:
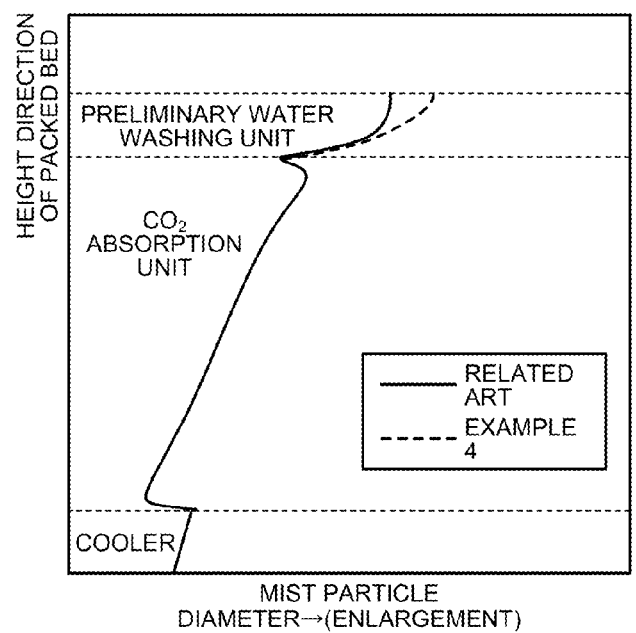
FIG. 15 is a diagram illustrating an enlargement tendency of a cooler and a $CO_2$ absorption unit in the gas flow direction with respect to a $SO_3$ mist particle diameter of the fourth embodiment.

FIG. 15 is a diagram illustrating the enlargement tendency in the cooler and the $CO_2$ absorption unit in the gas flow direction with respect to the $SO_3$ mist particle diameter of Example 4 corresponding to the fourth embodiment.

As illustrated in FIG. 15, the same behavior occurred up to the $CO_2$ absorption unit. However, when the flue gas entered the preliminary water washing unit, the particle diameter was enlarged in the height direction of the packed bed.

REFERENCE SIGNS LIST 10A to 10E $CO_2$ RECOVERY DEVICE
11 FLUE GAS

12 CO$_2$ ABSORBENT (ABSORBENT)
12A RICH SOLUTION
12B LEAN SOLUTION
13 CO$_2$ ABSORBER (ABSORBER)
13A CO$_2$ ABSORPTION UNIT
13B PRELIMINARY WATER WASHING UNIT
13C PRIMARY WATER WASHING UNIT
13D FINAL WATER WASHING UNIT
14 ABSORBENT REGENERATOR (REGENERATOR)
20 WASHING WATER
20a PART OF WASHING WATER
70A, 70B COOLER
70a COOLING UNIT
70b HEATING UNIT
80 DEMISTER

The invention claimed is:

1. An air pollution control system comprising:
a desulfurization device which removes sulfur oxides in a flue gas generated from a boiler;
a cooler which is provided at the downstream side of the desulfurization device and includes a temperature adjustment means to adjust a gas dew point temperature of the flue gas to enlarge a particle diameter of SO3 mist contained in the flue gas; and
a CO$_2$ recovery device which includes a CO$_2$ absorber bringing CO$_2$ in the flue gas into contact with a CO$_2$ absorbent so as to remove CO$_2$ therefrom and a regenerator recovering CO$_2$ by dissociating CO$_2$ from the CO$_2$ absorbent and regenerating the CO$_2$ absorbent,
wherein the temperature adjustment means includes a cooling unit including a heat exchanger to cool the cooled water circulating inside the cooler to be lower by 20° C. or more from a flue gas introduction temperature.

2. The air pollution control system according to claim 1, wherein a mist trapping means for trapping enlarged mist is provided near the top of the cooler.

3. The air pollution control system according to claim 1, further comprising:
a basic substance introduction means which is provided between the desulfurization device and the cooler so as to introduce a basic substance into the flue gas.

4. The air pollution control system according to claim 1, wherein the circulation water of the cooler is a desulfurization absorbent.

5. An air pollution control system comprising:
a desulfurization device which removes sulfur oxides in a flue gas generated from a boiler;
a cooler which is provided at the downstream side of the desulfurization device so as to remove sulfur oxides remaining in the flue gas and to decrease a gas temperature; and
a CO$_2$ recovery device which includes a CO$_2$ absorber bringing CO$_2$ in the flue gas into contact with a CO$_2$ absorbent so as to remove CO$_2$ therefrom and a regenerator recovering CO$_2$ by dissociating CO$_2$ from the CO$_2$ absorbent and regenerating the CO$_2$ absorbent,
wherein the CO$_2$ absorber includes
a CO$_2$ absorption unit which absorbs CO$_2$ in the flue gas containing CO$_2$ by the CO$_2$ absorbent,
a primary water washing unit which is provided at the downstream side of the CO$_2$ absorption unit in the gas flow direction so as to cool the flue gas, from which CO$_2$ has been removed by washing water, and to recover the entrained CO$_2$ absorbent by the washing water,
a circulation line which supplies the washing water containing the CO$_2$ absorbent recovered in a liquid storage tank of the primary water washing unit from the top of the primary water washing unit so as to circulate the washing water,
a preliminary water washing unit which is provided between the CO$_2$ recovery unit and the primary water washing unit,
wherein a part of the washing water containing the CO$_2$ absorbent is extracted from the primary water washing unit and the extracted washing water is supplied to the preliminary water washing unit, and wherein the CO$_2$ absorbent which is entrained in the flue gas from which CO$_2$ has been absorbed in the CO$_2$ absorption unit is preliminarily washed by the extracted washing water and a particle diameter of SO$_3$ mist containing the CO$_2$ absorbent is enlarged, and
a heater which heats the extracted washing water, wherein the heated washing water is supplied to the preliminary water washing unit.

6. The air pollution control system according to claim 5, further comprising:
a mist trapping means which is provided between the preliminary water washing unit and the primary water washing unit so as to trap mist.

7. An air pollution control system comprising:
a desulfurization device which removes sulfur oxides in a flue gas generated from a boiler;
a cooler which is provided at the downstream side of the desulfurization device, enlarges a particle diameter of SO$_3$ mist contained in the flue gas through a temperature adjustment means for adjusting a gas dew point temperature of the flue gas and decreases a flue gas temperature; and
a CO$_2$ recovery device which includes a CO$_2$ absorber bringing CO$_2$ in the flue gas into contact with a CO$_2$ absorbent so as to remove CO$_2$ therefrom and a regenerator recovering CO$_2$ by dissociating CO$_2$ from the CO$_2$ absorbent and regenerating the CO$_2$ absorbent,
wherein the CO$_2$ absorber includes
a CO$_2$ absorption unit which absorbs CO$_2$ in the flue gas containing CO$_2$ by the CO$_2$ absorbent,
a primary water washing unit which is provided at the downstream side of the CO$_2$ absorption unit in the gas flow direction so as to cool the flue gas, from which CO$_2$ has been removed by washing water, and to recover the entrained CO$_2$ absorbent by the washing water,
a circulation line which supplies the washing water containing the CO$_2$ absorbent recovered in a liquid storage tank of the primary water washing unit from the top of the primary water washing unit so as to circulate the washing water,
a preliminary water washing unit which is provided between the CO$_2$ absorption unit and the primary water washing unit,
wherein a part of the washing water containing the CO$_2$ absorbent is extracted from the primary water washing unit and the extracted washing water is supplied to the preliminary water washing unit, and wherein the CO$_2$ absorbent which is entrained in the flue gas from which CO$_2$ has been absorbed in the CO$_2$ absorption unit is preliminarily washed by the extracted washing water and a particle diameter of SO$_3$ mist containing the CO$_2$ absorbent is enlarged, and
a heater which heats the extracted washing water, wherein the heated washing water is supplied to the preliminary water washing unit.

8. The air pollution control system according to claim 7, further comprising:
a mist trapping means which is provided between the preliminary water washing unit and the primary water washing unit so as to trap mist.

9. The air pollution control system according to claim 7, further comprising:
a mist trapping means which is provided near the top of the cooler so as to trap enlarged mist.

10. The air pollution control system according to claim 7, wherein the temperature adjustment means is a cooling means which includes a heat exchanger cooling the cooled water circulating inside the cooler to be lower by 20° C. or more from a flue gas introduction temperature.

11. The air pollution control system according to claim 7, wherein the temperature adjustment means includes
a heating unit which includes a heater heating the circulation water circulating inside the cooler to be higher by 10° C. or more from the flue gas introduction temperature, and
a cooling unit which is provided at the downstream side of the heating unit and cools the heated flue gas to a $CO_2$ absorber introduction temperature or less.

12. The air pollution control system according to claim 7, further comprising:
a basic substance introduction means which is provided between the desulfurization device and the cooler so as to introduce a basic substance into the flue gas.

13. The air pollution control system according to claim 7, wherein the circulation water of the cooler is a desulfurization absorbent.

14. An air pollution control method comprising:
desulfurizing sulfur oxides in a flue gas generated from a boiler by a desulfurization device;
adjusting a flue gas temperature and to enlarge a particle diameter of $SO_3$ mist contained in the flue gas through cooling the cooled water circulating inside the cooler via circulation through a heat exchanger to be lower by 20° C. or more from a flue gas introduction temperature, or heating circulating water circulating inside the cooler to be higher by 10° C. or more from the flue gas introduction temperature; and
recovering $CO_2$ by a $CO_2$ absorber bringing $CO_2$ in the flue gas (11) into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent.

15. An air pollution control method comprising:
desulfurizing sulfur oxides in a flue gas generated from a boiler;
removing sulfur oxides remaining in the flue gas and decreasing a gas temperature by a cooler provided at the downstream side of a desulfurization device; and
recovering $CO_2$ by a $CO_2$ absorber bringing $CO_2$ in the flue gas (11) into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent,
wherein in the $CO_2$ absorber including
absorbing $CO_2$ in the flue gas containing $CO_2$ by the $CO_2$ absorbent,
performing a primary washing operation by a primary water washing unit which is provided at the downstream side of a $CO_2$ absorption unit in the gas flow direction so as to cool the flue gas, from which $CO_2$ has been removed by washing water, and to recover the entrained $CO_2$ absorbent by the washing water, and
performing a preliminary washing operation between the $CO_2$ absorbing operation and the primary washing operation,
wherein a part of the washing water containing the $CO_2$ absorbent used in the primary washing operation is extracted and is heated to be supplied to the preliminary water washing unit, and wherein the $CO_2$ absorbent entrained in the flue gas from which $CO_2$ has been absorbed by the $CO_2$ absorption unit is preliminarily washed by the extracted washing water and a particle diameter of $SO_3$ mist containing the $CO_2$ absorbent is enlarged.

16. An air pollution control system comprising;
a desulfurization device which removes sulfur oxides in a flue gas generated from a boiler;
a cooler which is provided at the downstream side of the desulfurization device and includes a temperature adjustment means to adjust a gas dew point temperature of the flue gas to enlarge a particle diameter of $SO_3$, mist contained in the flue gas; and
a $CO_2$, recovery device which includes a $CO_2$ absorber bringing $CO_2$ in the flue gas into contact with a $CO_2$ absorbent so as to remove $CO_2$ therefrom and a regenerator recovering $CO_2$ by dissociating $CO_2$ from the $CO_2$ absorbent and regenerating the $CO_2$ absorbent,
wherein the temperature adjustment means includes
a heating unit which includes a heater to heat circulation water circulating inside the cooler to be higher by 10° C. or more from the flue gas introduction temperature, and
a cooling unit which is provided at the downstream side of the heating unit in the gas flow direction and cools the heated flue gas to the $CO_2$ absorber introduction temperature or less.

17. The air pollution control system according to claim 16,
wherein a mist trapping means for trapping enlarged mist is provided near the top of the cooler.

18. The air pollution control system according to claim 16, further comprising:
a basic substance introduction means which is provided between the desulfurization device and the cooler so as to introduce a basic substance into the flue gas.

* * * * *